(12) United States Patent
Viswanathan et al.

(10) Patent No.: US 9,898,357 B1
(45) Date of Patent: *Feb. 20, 2018

(54) ROOT CAUSE DETECTION AND MONITORING FOR STORAGE SYSTEMS

(71) Applicant: Amazon Technologies, Inc., Seattle, WA (US)

(72) Inventors: Ganesh Viswanathan, Seattle, WA (US); Vinayak Sasikumar, Seattle, WA (US); Artur Pop, Bellevue, WA (US); Shuai Chang, Seattle, WA (US); Benjamin Ryan Zeghers, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 114 days.

This patent is subject to a terminal disclaimer.

(21) Appl. No.: 14/751,047

(22) Filed: Jun. 25, 2015

(51) Int. Cl.
*G06F 11/00* (2006.01)
*G06F 11/07* (2006.01)

(52) U.S. Cl.
CPC ........ *G06F 11/079* (2013.01); *G06F 11/0727* (2013.01); *G06F 11/0751* (2013.01); *G06F 11/0772* (2013.01)

(58) Field of Classification Search
CPC .......................... G06F 11/079; G06F 11/0754
See application file for complete search history.

(56) References Cited

U.S. PATENT DOCUMENTS

| 6,560,647 B1 | 5/2003 | Hafez |
| 7,571,139 B1 | 8/2009 | Giordano et al. |
| 8,738,972 B1 * | 5/2014 | Bakman .............. G06F 11/0712 714/47.1 |
| 8,954,979 B1 | 2/2015 | Myers et al. |
| 9,052,938 B1 | 6/2015 | Bhide |
| 9,104,572 B1 * | 8/2015 | Thompson ............ G06F 11/079 |
| 9,374,660 B1 | 6/2016 | Tilles |
| 2003/0135382 A1 | 7/2003 | Marejka |
| 2006/0224851 A1 | 10/2006 | Tamura et al. |
| 2006/0253658 A1 | 11/2006 | Mathieu et al. |
| 2007/0242601 A1 | 10/2007 | Gbadegesin |
| 2007/0288394 A1 | 12/2007 | Carrott |
| 2008/0104578 A1 | 5/2008 | Creamer et al. |
| 2009/0012748 A1 | 1/2009 | Beish et al. |
| 2009/0177692 A1 * | 7/2009 | Chagoly ............. G06F 11/0709 |

(Continued)

*Primary Examiner* — Elmira Mehrmanesh

(74) *Attorney, Agent, or Firm* — Knobbe, Martens, Olson & Bear, LLP

(57) ABSTRACT

Notification routines are described for implementation by a monitoring service. As part of an exemplary notification routine, a faulty storage volume is correlated at multiple logical storage levels of a storage system with other faulty storage volumes. The correlation pattern can follow a tree-based decision format, where each faulty storage volume is sequentially compared at a lower logical storage level. Advantageously, once a common logical storage component of a group of storage volumes is identified, a notification is issued about the group of faulty storage volumes sharing the common logical storage component. Additionally, notifications can be issued according to a severity level of the group of faulty storage volumes. In some embodiments, before issuing the notification, the group of faulty storage volumes can be compared to a time allowed for the group of faulty storage volume to be at fault.

22 Claims, 17 Drawing Sheets

(56) References Cited

U.S. PATENT DOCUMENTS

| | | |
|---|---|---|
| 2011/0264805 A1 | 10/2011 | Breitgand |
| 2012/0036387 A1 | 2/2012 | Nakashima et al. |
| 2013/0218547 A1* | 8/2013 | Ostermeyer ........ G06F 17/5009 |
| | | 703/13 |
| 2014/0068343 A1* | 3/2014 | Nakajima ........... G06F 11/3051 |
| | | 714/39 |
| 2014/0146650 A1 | 5/2014 | Alber |
| 2014/0201566 A1* | 7/2014 | Best .................... G06F 11/2094 |
| | | 714/6.11 |
| 2014/0223240 A1 | 8/2014 | Patil et al. |
| 2014/0229614 A1 | 8/2014 | Aggarwal |
| 2014/0280892 A1 | 9/2014 | Reynolds |
| 2014/0320500 A1 | 10/2014 | Fletcher |
| 2015/0067385 A1 | 3/2015 | Yuuki |
| 2015/0331766 A1 | 11/2015 | Sarfare |

* cited by examiner

ROOT CAUSE DETECTION AND MONITORING FOR STORAGE SYSTEMS

BACKGROUND

Generally described, computing devices can utilize a communication network, or a series of communication networks, to exchange data. Companies and organizations operate computer networks that interconnect a number of computing devices to support operations or provide services to third parties. The computing systems can be located in a single geographic location or located in multiple, distinct geographic locations (e.g., interconnected via private or public communication networks). Specifically, data centers or data processing centers, herein generally referred to as "data centers," may include a number of interconnected computing systems to provide computing resources to users of the data center. The data centers may be private data centers operated on behalf of an organization.

To facilitate increased utilization of data center resources, individual computing devices within a data center may be configured to provide specific functionality according to the requirements of the data center. Moreover, virtualization technologies may allow a single physical computing device to host one or more instances of a virtual machine (e.g., a virtual machine device), where the virtual machine device instance appears to a user of a data center as an independent computing device. With virtualization, the host computing device can create, maintain, delete, or otherwise manage virtual machine device instances in a dynamic manner. In turn, users can request computing resources (e.g., storage resources) from the data center, including single computing devices or a configuration of networked computing devices, and be provided with virtual machine device instances that provide the requested computing resources. Thus some hosted environments include virtual machine instances that act as computing resources for computing devices (e.g., clients). These virtual machine instances can then use storage resources in the data center.

To access these storage resources, the virtual machine instances can send storage command requests (e.g., input/output (I/O) requests) that allow the virtual machine instances to configure, access, and communicate with the storage resources. Clients can send storage requests to the virtual machine instances over the communications network. The virtual machine instances, in turn, can also send storage command requests to the storage resources.

DETAILED DESCRIPTION

Figure 1:
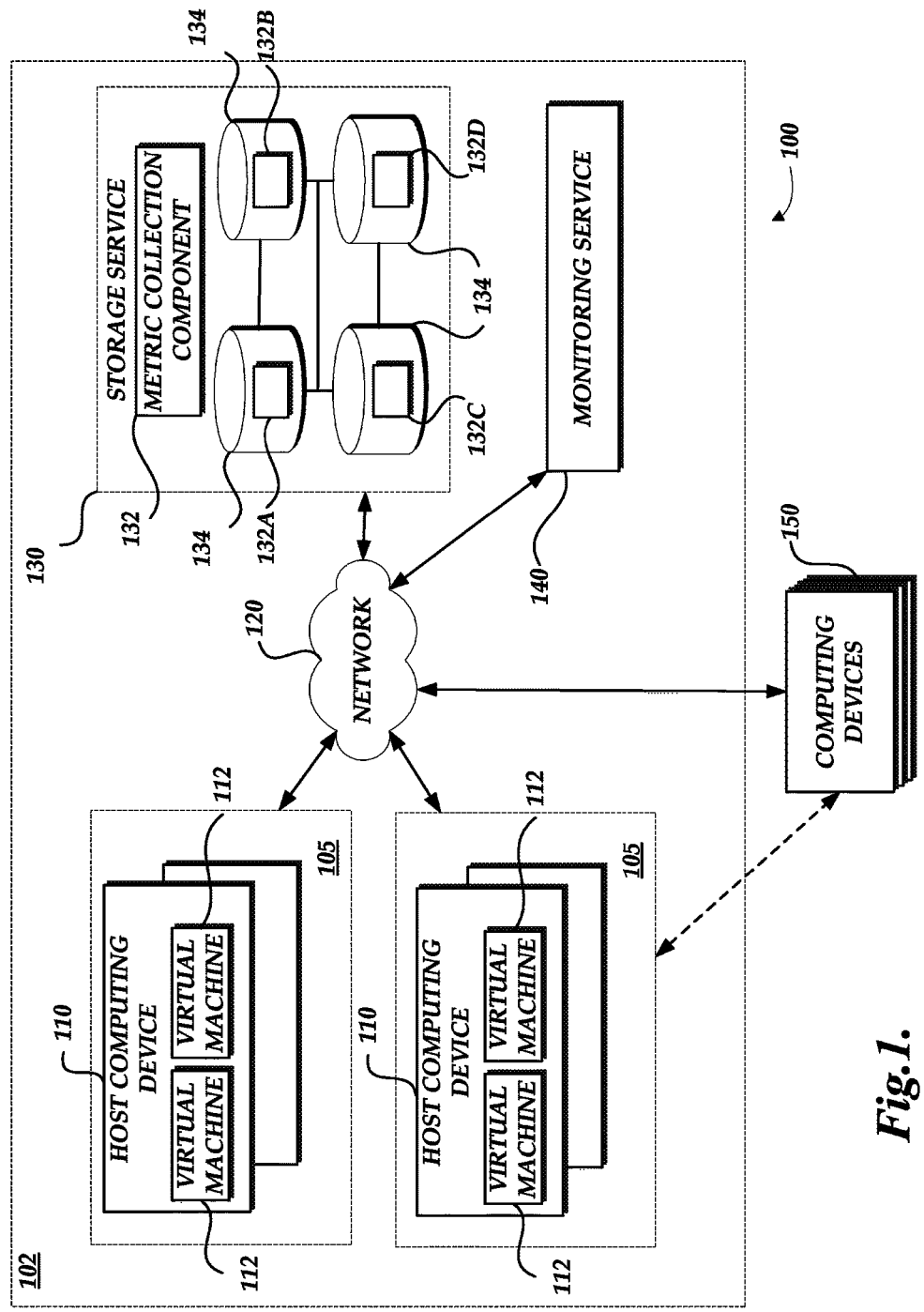
FIG. 1 is a block diagram depicting an illustrative network topology including multiple virtual computing device instances, a storage service with storage volumes, and a monitoring service interconnected via a network.

Generally described, network-based storage command requests can be monitored via metrics collected by a storage service. A data center operator using a storage service that hosts storage volumes receiving the storage command requests can evaluate the performance of various metrics by collecting, processing, and monitoring storage command metrics. For example, a storage command metric such as the number of input/output (I/O) operations per second can indicate how fast data is accessed from a storage volume. Because data centers often include thousands of storage volumes, the number of storage command metrics can be numerous and the traditional collection and processing of metric information does not scale well. The scalability of collecting, processing, and monitoring an increasing number of storage volumes can lead to difficulty in assessing a storage system issue or a storage volume that is not performing properly. That is, because an increasing number of faults can occur with an increasing number of storage volumes, assessing whether a fault is a priority or severe can be difficult. With metrics tied to specific storage volumes or specific logical storage components (e.g., a physical storage rack, a server, a data center), metrics, in some cases, may not accurately indicate a root cause of a storage system issue or irregularity-if at all.

More specifically, storage command metric information, in many cases, is only available to a monitoring service as associated with specific storage system components such as a storage volume itself or a data center region. Accordingly, performance data is limited to the data transmitted from a specific storage system component. Further, data centers with several storage volumes can contain numerous storage command requests. Processing and analyzing further storage command metrics by a monitoring service could add a significant overhead, possibly degrading performance by the storage system and/or monitoring service. Further still, when a storage system anomaly is detected after analysis of a certain storage command metric, the root cause of the storage system anomaly may be unknown. Because that storage command metric is linked to a single storage system component, the identified anomaly may only reflect that that storage system component is being affected, with the root cause of that identified anomaly being elsewhere in the storage system. Thus, storage command metric information, in these cases, may not determine, or even indicate, the root cause of a storage system issue accurately, much less indicate efficiently the root cause of storage system that has been scaled upwards due to an increasing number of operating storage volumes.

Generally described, the present disclosure relates to processing storage command metrics and identifying correlation relationships across multiple storage components (e.g., a storage volume). More specifically, aspects of the present application correspond to systems, methods and computer-readable media related to the monitoring of storage command metrics collected associated with the processing of various storage command requests. Illustratively, the present application will be described with regard to the processing of storage command requests transmitted by a client computing device on a network, such as virtual machine instance operating in a hosted environment on behalf of a physical client computing device. In various embodiments, the storage command requests are transmitted to network-based storage volumes to access data for the client computing device. A storage system can include multiple hierarchal levels starting at a storage volume, then a storage server, and, finally, a data center or a geographical region of data centers. The hierarchal levels can be referred to as logical storage levels.

In various embodiments of the present disclosure, the monitoring service identifies root causes of storage system issues using correlation relationships among multiple logical storage levels of the storage system. The monitoring service can use the storage command metrics to identify correlated relationships among the multiple logical storage levels of the storage system. Advantageously, the correlation relationships associated with logical storage levels can be used to detect a root cause of a storage system issue at one of those storage elements (e.g., a faulty storage volume). The monitoring service can then notify an operator of the storage system about the root cause of the storage system issue.

Further still in various embodiments, if the faulty storage volumes are the root cause, various notification routines can be implemented by the monitoring service. A faulty storage volume is correlated at multiple logical storage levels of a storage system with other faulty storage volumes. The correlation pattern can follow a tree-based decision format: correlating each volume at a sequentially lower logical storage level. Once a common characteristic of a group of storage volumes is identified (e.g., sharing the same master/slave server), a notification (e.g., a ticket) can be issued regarding the group of faulty storage volumes sharing a common characteristic. In various embodiments, before issuing the notification, the group of faulty storage volumes can be compared to a time threshold, which can be a time allowed for the group of faulty storage volume to be at fault.

In other embodiments of the present disclosure, notifications are to be suppressed because not all notifications of faulty volumes are necessary. Suppression rules can indicate that a faulty storage volume is at fault because it is associated with a suppression category (e.g., a test volume), associated with a large power outage, or some other learned event from storage command metrics. Thus, the monitoring service can suppress notifications about these known system issues, among others.

In various other embodiments, storage command metrics can be calculated (e.g., metric math) to identify faulty or slow storage volumes. Metric values are calculated from retrieved metric equations that are associated with selected storage command metrics. Storage command metrics can also have associated metric alarm thresholds. Such alarm thresholds can indicate that an anomaly has been detected. For example, the identified storage volume is determined to be a faulty or slow storage volume. Calculated metric values are compared to the alarm thresholds to determine whether the alarm threshold has been exceeded.

The foregoing aspects and many of the attendant advantages will become more readily appreciated as the same become better understood by reference to the following description of illustrative embodiments, when taken in conjunction with the accompanying drawings depicting the illustrative embodiments. The illustrative embodiments described below do not necessarily imply that any combination of features is required. Additionally, in some embodiments, the features of the illustrative embodiments can be combined.

FIG. 1 is a block diagram depicting an illustrative network topology 100 including multiple hosts 110 with multiple sets of client computing devices 150 that communicate with the virtual machines 112 via network 120. Illustratively, the client computing devices 150 communicate via network 120 to virtual machines 112. Client computing devices 150 use virtual machines 112 to access storage volumes 134 via network 120. Accordingly, storage volumes 134 are provisioned for attachment to virtual machines 112 as storage resources for client computing devices 150.

Client computing devices 150 may generally include any computing device receiving the storage services provisioned through virtual machines 112 to the storage service 130. While the term "client" is used in reference to client computing devices 150, client computing devices 150 should not be construed as limited to end user computing devices. Rather, client computing devices 150 may include end user devices, devices owned or operated by other service providers, or devices owned or operated by an administrator of hosts 110 (e.g., a data center operator). Examples of client computing devices 150 include, but are not limited to, laptops, personal computers, tablet computers, personal digital assistants (PDAs), hybrid PDA/mobile phones, mobile phones, electronic book readers, digital media players, wearable computing devices, integrated components for inclusion in computing devices, appliances, electronic devices for inclusion in vehicles or machinery, gaming devices, set top boxes, electronic devices for inclusion in televisions, and the like.

The network topology 100 further includes a network 120 operable to enable communication between the hosts 110, storage service 130 with metric collection component 132 and storage volumes 134, client computing devices 150, and the monitoring service 140. The network 120 may be, for instance, a wide area network (WAN), a local area network (LAN), or a global communications network.

The illustrated network topology 100 further includes a number of storage volumes 134 in a storage service 130. Storage service 130 can be referred to as a storage service network. Generally, a storage volume 134 may correspond to a hard disk drive, network accessible storage, or any other type of perpetual or substantially perpetual storage accessible by one or more of the client computing devices 150. For example, the storage volumes 134 of FIG. 1 may correspond to network accessible storage devices. Though depicted as external to client computing devices 150, in some embodiments, storage volumes 134 may be internal to a specific client computing device 150.

The storage service 130 also contains the metric collection component 132 that is configured to collect storage command metrics regarding storage command requests, process the storage command requests, and subsequently send the storage command metrics to the monitoring service 140. More specifically, metric collection component 132 processes storage command requests and collects storage command metrics regarding storage command requests from the virtual machines 112 accessing storage volumes 134. Storage service 130 may then provide these storage command metrics, in some embodiments stored within network 130, to the monitoring service 140 for further storage command metric processing (e.g., processing the storage command metrics for correlations). In one embodiment, a host 110 may include a single computing device (e.g., a server). Similarly, storage service 130 may include a single computing device (e.g., a storage server).

In another embodiment, a host 110 may include multiple computing devices in communication with one another, collectively providing a service to the client computing devices 150. And again similarly, the storage service 130 contains several storage volumes 134, existing as physical devices and communicating over a network to each other. A hosted computing environment of the host 110 may also be referred to as a cloud computing environment.

Further, in other embodiments that are not illustratively depicted in FIG. 1, metric collection component 132 may reside on one of the hosts 110 or across several hosts of hosts 110. As an example, in one embodiment, the metric collection component 132 can be instantiated as part of a virtual machine 112. In such an embodiment, virtual machine 112 can receive storage command metrics for storage command requests sent by virtual machine 112. Such storage command metrics can be collected by an agent on a storage volume 134 of storage service 130. In some embodiments, the storage command metrics can be sent with storage command processing results that storage volume 134 processes in response to the storage command requests sent by virtual machine 112. As one skilled in the art may recognize, metric collection component 132 can be configured to operate on any network entity associated with network 120. For example, metric collection component 132 may be configured to operate on a single computing device (e.g., a storage server) or several multiple computing devices in communication with one another. In another embodiment, depicted in FIG. 1, metric collection component 132 can exist as individual instances such as metric collection components 132A-132D on each storage volume 134. In such an embodiment, metric collection components 132A-132D can each collect storage command metrics regarding their respective storage volume. In another embodiment, metric collection component 132A can collect storage command metrics regarding multiple storage volumes 134 in storage service 130. As can be seen from this description, various configurations are possible for metric collection components 132A-132d when collecting storage command metrics in network topology 100.

In one embodiment, metric collection component 132 resides as an agent on a storage volume 134. In such an embodiment, metric collection component 132 can collect and aggregate storage command metrics sent to storage service 130 by virtual machines 112 or processed on storage service 130. The agent can aggregate storage command metrics from the various storage command requests processed on the storage volumes 134. Because an agent on metric collection component 132 aggregates metrics where the storage command requests are being processed, real-time storage command metrics can be provided to the monitoring service 140.

The illustrated network topology 100 further includes the monitoring service 140 within the data center network 102. Monitoring service 140 receives storage command metrics from the storage service 130. In other embodiments, monitoring service 140 can receive storage command metrics from another storage center network, a database, an archive, or any other network entity capable of providing storage command metrics. Generally, the monitoring service 140 can correspond to a hard disk drive, network accessible storage, or any other type of perpetual or substantially perpetual storage accessible by one of the virtual machines 112. For example, the monitoring service 140 of FIG. 1, in some embodiments, corresponds to a network accessible storage server. In some embodiments, the monitoring service is viewed as a centralized service specifically for the storage volume network 130. Accordingly, in some embodiments, the monitoring service 140 can be referred to as a centralized storage monitoring service. Further, in other embodiments that are not illustratively depicted in FIG. 1, monitoring service 140 may reside on one of the hosts 110 or across several hosts of hosts 110. As one skilled in the art may recognize, monitoring service 140 can be configured to operate on any network entity associated with network 120. For example, monitoring service 140 may be configured to operate on a single computing device (e.g., a storage server) or several multiple computing devices in communication with one another. As another example, the monitoring service 140 can be configured to operate and be considered, at least logically, to be part of storage service 130.

In various embodiments, the monitoring service 140 obtains from the storage volume network 130 the collected storage command metric information via network 120. After receiving the collected storage command metric information, the monitoring service 140 further processes the storage command metrics into statistics, for example, generating correlations to identify correlation relationships or determining a performance threshold. With these statistics, the monitoring service 140 determines or detects slow or faulty storage volumes performing storage command operations slowly or inefficiently. As an example of a slow storage volume, a certain storage volume processing a storage command can be congested. The congestion can be due a long queue length for I/O operations. As another example, a certain I/O operation (e.g., an I/O read or an I/O write) can take more time than other similar I/O operations. As an example of a faulty storage volume, a storage volume can be referred to as a faulty storage volume if the number of read and write I/O operations per second falls below a certain threshold. In some cases, the faulty storage volume can additionally have a long queue length for those read and write I/O operations.

In various embodiments, the monitoring service 140 identifies correlation relationships across multiple storage volumes, or even in a hierarchal or tree-approach across multiple logical storage levels (e.g., physical storage computing device, rack, server, data center, region, and network). These correlation relationships can be used to detect root causes of storage system issues, at either a specific faulty volume, at various logical storage levels, or at a specific logical storage level. For example, a root cause can be detected at a physical computing device that includes multiple storage volumes, where the physical computing device is at a higher logical level than a storage volume. Or, as another example, a root cause can be detected at a specific logical storage level, across multiple logical storage components at that level such as logical storage racks having a faulty connection. In one embodiment, the faulty connection can be due to a fiber cut to both the physical devices that correspond to the logical storage racks. The monitoring service 140 publishes or makes accessible these identified root causes to the virtual machines 112. In various embodiments, the monitoring service 140 may be viewed as making accessible these identified root causes to any network entity within the network 120. Components and attributes of the monitoring service 140 are further described below with respect to FIGS. 2 and 3B-3D.

In various embodiments, the monitoring service 140 can monitor various levels of a storage system. In some cases, these levels can correspond to logical levels not defined by the hardware at that level, but existing at throughout one or more physical computing devices having processors. A logical storage level can correspond to a single computing device (e.g., a storage server) or several multiple computing devices, at that level, in communication with one another. For example, at a top-of-rack (TOR) logical level, a physical computing device can be a TOR switch configured to switch among several storage servers or storage computing devices. Other logical storage levels are possible. In other embodiments, a logical storage level can correspond to a physical computing device hosting several storage volumes, a server computing device hosting storage volumes, a data center room, a data center itself, a zone of data centers, and a geographical region of data centers (e.g., several zones of data centers in the Western US). As can be seen from this description, various configurations are possible to define a logical storage level. In some embodiments, the logical storage level can correspond to a deduplication type; that is, a storage system can employ deduplication techniques at a particular storage level to, in part, reduce duplicate copies of data stored across that level.

In various embodiments, the monitoring service 140 can also collect storage command metrics for processing with thresholds, allowing storage systems to be scalable and more efficient. Storage command metrics can be collected at each logical storage system level and, then, compared to a threshold to determine whether a certain storage command metric indicates a storage system anomaly (e.g., a storage system issue). In some embodiments, a trailing average can be computed from a storage command metric, only indicating a threshold breach if that trailing average is greater than (or less than, depending on the metric) the threshold. Such a threshold comparison can allow a storage system to be more efficient when identifying anomalies. In some cases, this approach can indicate a higher priority anomaly than identified by analysis of the storage command metric itself. For example, a trailing average for read I/O operations at storage server X can be computed over a period of week by adding the $n^{th}$ value of read I/O operations metric received, on Wednesday, to the sum total of all read I/O operations received since Sunday; then, dividing by n (e.g., four, if n equals a read I/O operations metric received each day). That computed trailing average can indicate a breach, in contrast to the read I/O operations received on Tuesday, which would not have breached the trailing average threshold. Accordingly, the trailing average threshold can indicate an anomaly where a storage command metric alone may not.

As another example of a threshold approach for storage system scalability, a threshold can correspond to an upper band and a lower band. The upper band and lower bands can be computed based on the performance of the storage system generally, with the bands defining unusual or statistical outlier performance. A threshold breach is indicated when a metric falls outside of those bands. In one embodiment, an outlier is identified because it falls below a performance threshold computed using various statistical processing techniques and the storage command metrics. Such an outlier can be a slow performing arc, indicating to an operator of a data center that a change may be need to improve performance of the systems, or storage command requests generally. In another embodiment, an operator of the storage system can define the threshold (e.g., a user-defined threshold) so that the operator is notified if a certain storage command metric breaches the threshold. As can be seen from this description, various thresholds can be employed, allowing a storage system to better indicate system-wide anomalies, rather than analyzing individual storage command metrics that may be overwhelming for the monitoring service 140 to process or an operator (or several operators) of a storage system to act upon. In some cases, this threshold approach can make a storage system more efficient because it uses less processing time or processing power, resulting in a cost savings by hardware and/or power.

Figure 2:
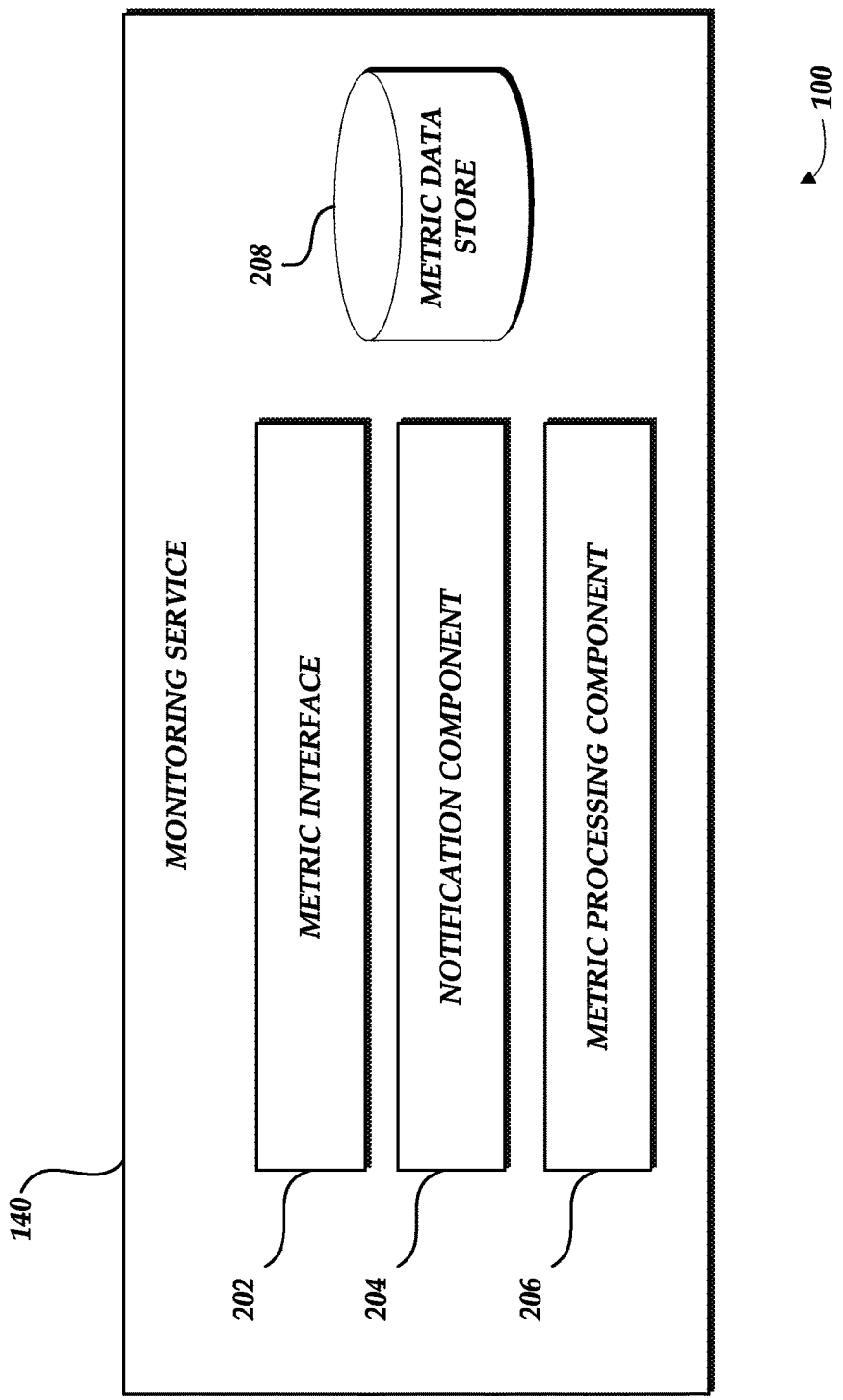
FIG. 2 is a block diagram depicting illustrative components of a monitoring service included within the network topology of FIG. 1.

FIG. 2 is a block diagram depicting illustrative components of a monitoring service 140 included within the network topology of FIG. 1. The monitoring service 140 includes a metric interface 202 for receiving collected storage command metric information. In various embodiments, the collected storage command metric information is received by metric interface 202 from the storage service 130. In other embodiments, the collected storage command metric can be received by metric interface 202 from other network entities in network 120. For example, metric interface 202 can receive storage command metric information from a virtual machine 112 that has been instantiated as metric collection component 132. The monitoring service 140 further includes a notification component 204, which publishes (e.g., makes accessible) notifications regarding root causes identified from various correlation relationships. In some embodiments, the notification component 204 includes suppression rules that suppress notifications regarding root issues if the criterion for a certain rule is satisfied. In one embodiment, a data center operator of a data center network 102 can access these published statistics via the network 120. The monitoring service 140 also includes a metric processing component 206, which processes storage command requests into storage command processing results and collects storage command metrics, in part, from the storage command processing results. The collected storage command metrics can be stored in metric data store 208, also included in monitoring service 140.

Metric data store 208 can additionally include data about storage volumes 134, including, but not limited to: an ID for a storage volume, a partition ID(s) for a storage volume, an account for a storage volume (e.g., a customer account associated with the storage volume); a type of storage volume, the IP address of a master storage server; the IP address of a slave storage server, the number of times that a storage volume has been faulty and/or recently failed a storage command; the status of a storage volume; a time that the status of a storage volume was last updated. In some cases, if the storage volume is determined to be faulty or has a storage system issue, metric data store 208 can include additional data about the storage volume, including, but not limited to: a flag indicating whether a storage volume is currently faulty and/or recently failed a storage command; various start and stop times of a storage volume for performing storage command requests (e.g., the start and stop time for a failed I/O operation); an ID of a notification issued (e.g., a help ticket) to correct or rectify the faulty volume; a severity for the corresponding notification; a deduplication type for the corresponding notification; a time that the corresponding notification has been updated and/or reissued; a status of the corresponding notification (e.g., whether the notification has been acted upon an operator of the data center or monitoring service 140); and a root cause for the corresponding notification (e.g., the root cause of the faulty storage volume as specified by the notification).

Illustratively, the notification component 204 and the metric processing component 206 may include a number of hardware and software components. More specifically, the notification component 204 and the metric processing component 206 may include hardware, software, configuration data, data structures, computer-readable code, or any type of information that can be loaded into memory and processed or published by the notification component 204 and the metric processing component 206 respectively. Aspects of the notification component 204 and the metric processing component 206 will be described in further detail below with respect to FIG. 3A-3D that illustrate monitoring service 140, among other actions, processing storage command metrics to detect a root cause and notifying various network entities of the root cause. In various embodiments, reference to the monitoring service 140 within the present disclosure may include multiple computing devices working in conjunction to facilitate the processing of collected storage command metric information and publishing of overall statistics. For example, in various embodiments, the monitoring service 140 may be distributed through a network or implemented by one or more virtual machine device instances.

The metric interface 202 may refer to a physical communication interface on a physical computing device. The metric interface 202 may be an electrical communication interface, an optical communication interface or other type of interconnect interface known in the art. The metric interface 202 may be configured to provide communications between units within the monitoring service 140 (e.g., the metric processing component 206) and the virtual machine instances 112 hosted on hosts 110. Illustratively, the configuration of the metric interface 202 may be optimized based on specific criteria, such as low latency, high speed, and high bandwidth, among others. In some embodiments, the interconnect interface may correspond to a high speed serial computer expansion bus, such as a Peripheral Component Interconnect Express (PCIe) bus. One skilled in the relevant art will appreciate that the metric interface 202 may incorporate alternative or additional standard interconnect interfaces well known to those skilled in the art.

Figure 3A:
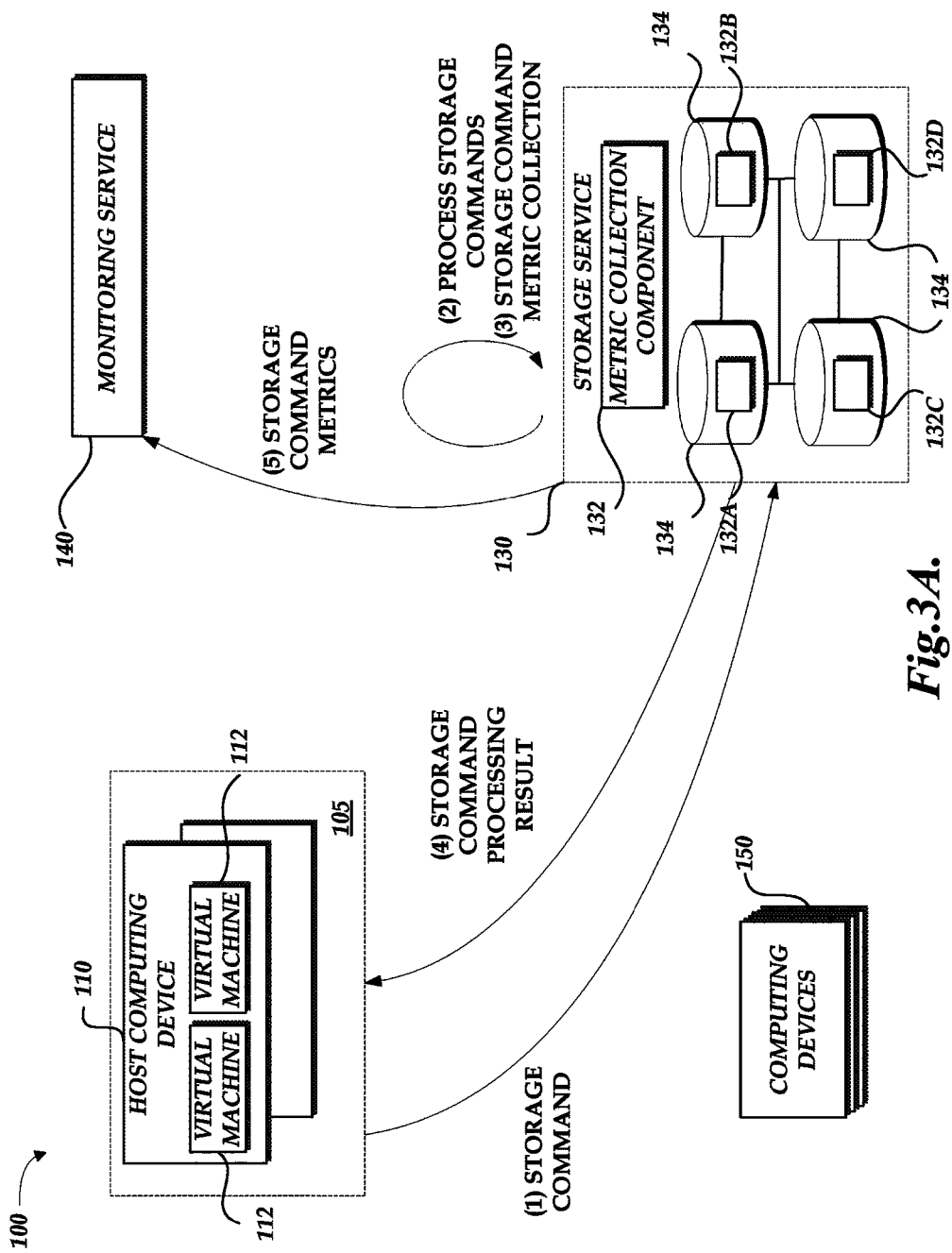
FIG. 3A is a block diagram of the network topology of FIG. 1 illustrating transmission of a storage command request and storage command metric collection.

FIG. 3A is a block diagram of the network topology of FIG. 1 illustrating the transmission of a storage command request and storage command metric collection. As illustrated in FIG. 3A at (1), the storage command metric collection process begins with a storage command (e.g., a storage command request) sent from host computing device 110. Such a storage command request can be sent by a virtual machine 112 on behalf of a client computing device (e.g., a client computing device of client computing device 150). A storage command request may be any request for a storage volume 134 that uses the storage resource in some way. For example, in one embodiment, the storage command request corresponds to a data backup request. Or, as another example, a storage command can be an I/O replication request that includes a read to a master storage volume and a write to slave storage volume. As another example, a write I/O storage command request can include two portions: a local write to a storage volume 134 and a remote write to another storage volume 134. Various storage command requests are possible.

As depicted in the illustrative embodiment at (2), storage service 130 processes the storage command. A storage command may require processing on multiple storage volumes 134 or a single volume 134. In some cases, the storage service 130 can determine the storage volume 134 to process the storage command request. In other cases, the storage command request can include header information indicating the storage volume 134 to process the storage command request.

Next, at (3), storage service 130 collects storage command metrics based on the storage commands processed (e.g., counting the number of I/O read operations performed, whether successful, aborted, or failed). In some embodiments, storage service 130 uses the storage command results to collect storage command metrics (e.g., counting the number of successful I/O read operations at a particular storage volume 134). Various metrics can be collected, including, but not limited to: the number of read I/O operations per/second; the number of write I/O operations per second; the server service time; read latency; write latency; the number of errors or flags for storage volumes that indicate errors during processing; the number of volumes per second that are faulty; the number of valid copies of data to a storage volume or to a logical storage level; the number of storage volumes in use by count; the number of storage volumes in use by memory; the number of active storage volumes; the number of storage servers in use; the amount of memory read (e.g., size of I/O reads) for a particular storage volume or several storage volumes; the amount of memory written to a storage volume (e.g., size of I/O writes) for a particular storage volume or several storage volumes; the queue length of a storage volume; the hardware diagnostics (e.g., disk usage, CPU & memory utilization) for a particular storage volume; the network diagnostics (e.g., number of hops, latency) for a particular storage volume; the percentage of use for I/O operations at a particular storage volume; and the percentage of time that a particular partition on a particular storage volume is used. As can be seen from this description, various storage system metrics are possible.

Similar metrics can be varied for storage components at each logical storage level (e.g., the amount of memory read for a particular storage server or data center). Accordingly, metric collection component 132 can collect several metrics for storage service 130. Metric math can also be performed on these collected storage command metrics. Aspects of metric math will be described in further detail below with respect to FIG. 7 that illustrates a metric processing routine that can be implemented by monitoring service 130. In some cases, the steps depicted as (2) and (3) can occur simultaneously with storage service 130 employing various processors to perform such steps as parallel computing operations.

Continuing in the illustrative embodiment at (4), storage service 130 sends the storage command process result to the host computing device 110. In some embodiments, this can be viewed as a response to the storage command sent at step (1) by the host computing device 110. Accordingly, storage command processing result can be directed to that virtual machine 112 that originally sent the storage command. As but one example, if an I/O read storage command was originally sent by virtual machine 112, the storage command processing result can be the data that was read from storage volume 134; or, in another embodiment, the storage command processing result can be an acknowledgement that the I/O read storage command was performed. Next at (5), storage service 130 sends the collected storage command metrics to monitoring service 140. In some embodiments, the storage command metrics sent at (5) can include additional metrics acquired from another network entity with network 120. Or in some embodiments, the storage command metrics can include additional metrics gathered specifically for an additional relationship identified or an interesting entity identified by monitoring service 140. Aspects of additional metrics gathered for various uses will be described in further detail below with respect to FIG. 3C that illustrates a monitoring service 130 identifying and monitoring additional metrics after receiving collected storage command metrics. In some cases, the steps depicted as (4) and (5) can occur simultaneously with storage service 130 employing various processors to perform such steps as parallel computing operations.

Figure 3B:
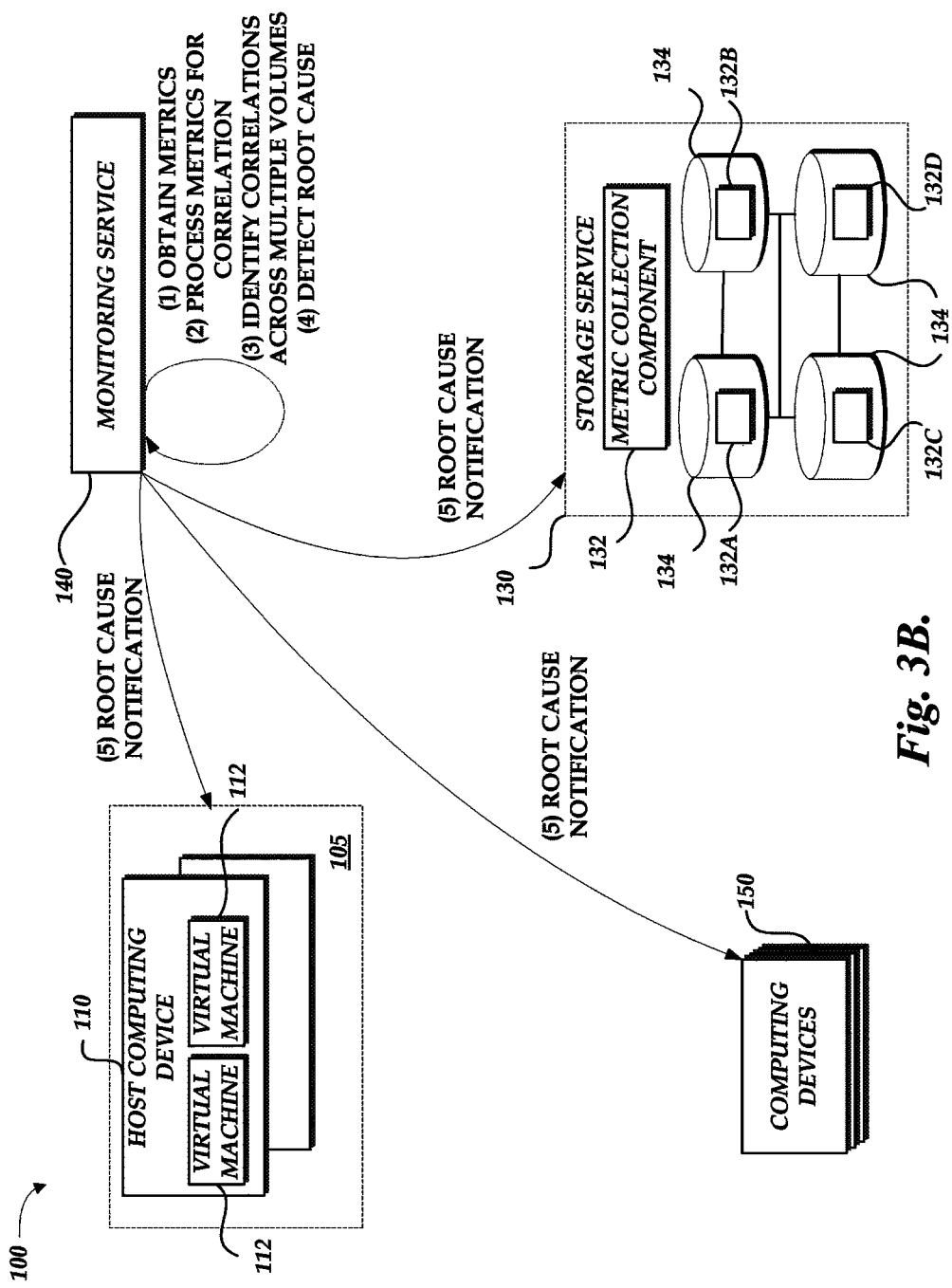
FIG. 3B is a block diagram the network topology of FIG. 1 illustrating a monitoring service processing storage command metrics to detect a root cause and notifying various network entities of the root cause.

With reference now to FIG. 3B, a block diagram depicts a the network topology of FIG. 1 illustrating a monitoring service processing storage command metrics to detect a root cause and notifying various network entities of the root cause. At (1), monitoring service 140 obtains storage command metrics. In various embodiments, storage command metrics can be obtained from storage service 130 as described with reference to FIG. 3A. In other embodiments, monitoring service 140 can obtain metrics from a data store within monitoring service 140 or any other network entity within network 120. Monitoring service 140 obtains the storage command metrics necessary to process the storage command metrics, which will be used to identify correlation relationships and detect root causes of storage system issues within storage service 130. In some embodiments, monitoring service 140 can obtain metrics independent of any storage command response or any storage command request for metrics. For example, even though no I/O process is being executed on a storage volume 134 in response to a storage command request, metric collection component can collect metrics regarding other aspects of a storage volume 134. As but one example, metrics can be obtained from storage service 130 indicating an idle state of a storage volume 134. In such a case, a storage command request is not necessary to collect a metric regarding the idle state of a storage volume 134.

At (2), monitoring service 140 processes the storage command metrics to generate correlation processing results. Correlation processing results can also be referred to as correlations of logical storage elements. Monitoring service 140 identifies certain storage command metrics to perform a correlation between a storage volume 134 and another logical storage element of storage service 130. For example, using the definition of a faulty volume as defined above (e.g., the number of read and write I/O operations per second falls below a certain performance threshold for that storage volume 134 and the queue length at that storage volume 134 is a certain length), monitoring service 140 can compare the number of I/O read operations per second at a particular storage volume with the number of I/O read operations per second at the storage server hosting the particular storage volume. If the monitoring service 140 similarly compares the number of I/O read operations per second at other storage volumes that are also hosted by the same storage server, several correlations processing results can be generated for each storage volume hosted by that storage server. In various embodiments, such correlation processing results can be generated for each respective storage level. That is, correlation processing results can be generated for each logical storage element located at a lower logical storage level as compared to hierarchal logical storage element at the higher logical storage level above the respective lower logical storage elements (e.g., the storage element hosting the lower storage elements). In addition, the various storage command metrics described above can be used to obtain a variety of correlation processing results for each of these logical storage levels. Accordingly, continuing in the same example, monitoring service 140 can further compare the number of I/O read operations per second at the storage server hosting the particular storage volumes with the number of I/O read operations per second with the room of the data center where the storage server is housed. Correlation processing results can also be generated for higher levels that are more than a degree of freedom from an initial lower logical storage element. As another example, monitoring service 140 can further compare the number of I/O read operations per second at the storage server hosting the particular storage volumes against the number of I/O read operations per second at data center itself, rather than a particular room in the data center. In various embodiments, the correlation processing results generated between logical storage levels can be viewed as a hierarchal approach or a tree approach to generating correlations for various storage elements across the storage system.

As but one example to illustrate the correlation processing result generated at (2) when processing the storage command metrics, a storage server hosting several storage volumes in storage service 130 can have a certain number of failed I/O operations. If the data center hosting that storage server has a proportionally scaled certain number of failed I/O operations, the data center and that storage server can be said to be correlated. In one computation system, this can be viewed as having a unitary result, or 1. If however, the data center were to have no failed I/O operations except those by that storage server, the data center and that storage server can be said to be non-correlated. In one computation system, this can be viewed as having a null result, or 0.

Still referring to FIG. 3B, next at (3), monitoring service 140 can identify correlation relationships from the correlation processing results generated after processing the storage command metrics. Continuing in the same example from above, the correlation processing results generated from comparing the storage server hosting the particular storage volumes with the storage volumes themselves can be used to identify a first set of relationships. That is, each storage volume bears a correlation relationship with the storage server hosting that storage volume, which is the first set of relationships. In addition, the correlation processing results generated from comparing the data server that is hosting the particular storage volumes with the storage servers can be used to identify a second set of relationships. In turn, both the first and the second set of relationships can be used to identify a correlation relationship between a particular storage volume and the data center. An identified correlation relationship can also be one of the first set of relationships identified or one of the second set of relationships identified.

In various embodiments, the monitoring service 140 can use priorities to determine which correlation relationships are to be identified first. In some cases, defining priorities can be used to make alarming and/or notifying of root causes more efficient and perform more accurate correlation processing results. For example, by defining hierarchal tree in a specified priority level, a correlation processing result can be more efficiently obtained for a logical storage level of interest. To define the priority, additional data can be obtained by monitoring service 140 including, but not limited to: information regarding the storage system architecture, a known storage system issue, or a storage system event (e.g., a large-scale event such as a power outage that affects a significant number of storage volumes). As an example of information regarding the storage system architecture, data can be obtained by the monitoring service 140 that a particular data center region has been scaled to include several new data centers. In this case, a priority level may be assigned to that data center region because monitoring of those new, added volumes is critical when first in operation. As an example of a known storage system issue, information may be available regarding a particular customer of the storage system that has caused storage system issues in the past. In this case, storage elements that are associated with that past troublesome customer can be associated with a higher priority level so that correlation relationships are more efficiently identified and future potential root causes averted more efficiently. Finally, as an example of a storage system event that can be used to define a priority level, the monitoring service 140 can obtain information about an identification of a client computing device 150 that is instantiating several storage volumes in storage service 130. In such a case, client computing device 150 may not be authorized to instantiate several storage volumes. Accordingly, such an event can affect other storage volumes in a detrimental way (e.g., by increasing the queue lengths of other storage volumes). Thus, such an event can be associated with a higher priority level so that correlation relationships are more efficiently identified and the root cause itself (e.g., the instantiation of several storage volumes) can be ended quickly or aborted altogether. In various embodiments, an event that affects multiple storage volumes, types of storage volumes or geographic areas of storage volumes can be characterized as a "large scale event." As another example of an event that affects multiple storage volumes, client computing device 150 can instantiate several storage volumes that are associated with a particular customer of the storage system. Such a large-scale instantiation can cause storage system issues and be identified by monitoring service 140 as a root cause.

Still referring to FIG. 3B, next at (4), monitoring service 140 can detect root causes of storage system issues or faulty storage volumes from the correlation relationships identified. Continuing in the same example from above, using the identified correlation relationship of the particular storage volume and the data center, the monitoring service 140 can detect that a root cause of a storage system issue is a result of the particular storage volume or if it is the result of the data center at-large. If the latter case, the various other identified relationships between storage volumes on the same server and within the same data center will indicate that the data center is faulty. If those various other identified relationships do not indicate that a correlation exists between those storage volumes on the same server and the data center, monitoring service 140 can determine that the root cause of the storage issue is the particular storage volume. In various embodiments, monitoring service 140 can determine that the root cause of a storage system issue is the particular storage volume by using a threshold comparison. For example, as described above with respect to FIG. 2, the threshold can be a trailing average focused on a certain metric for a certain period of time (e.g. a week or a day). Or the threshold can be a lower band and an upper band, where the certain metric either falls below the lower band or exceeds the upper band. Thresholds can be used to evaluate both portions of the identified correlation relationship, continuing in the same example: a data center threshold is used for comparison of the data center; while a storage volume threshold is used for the comparison of the particular storage volume. If the data center threshold is not breached, but the threshold of the particular storage volume is, the monitoring service 140 can determine that the particular storage volume is the root cause of the storage system issue. Likewise if the particular storage volume threshold is not breached but data center threshold is breached, the monitoring service 140 can determine that the data center is the root cause of the storage system issue. If both thresholds are breached, monitoring service can use a more detailed, fine-tuned analysis of both storage elements as described below with respect to FIG. 3C. As can be seen from this description, after the identified correlation relationship is determined, monitoring service 140 can use the storage command metrics to determine whether the root cause of a storage system issue is attributed to a particular storage system element.

Figure 3C:
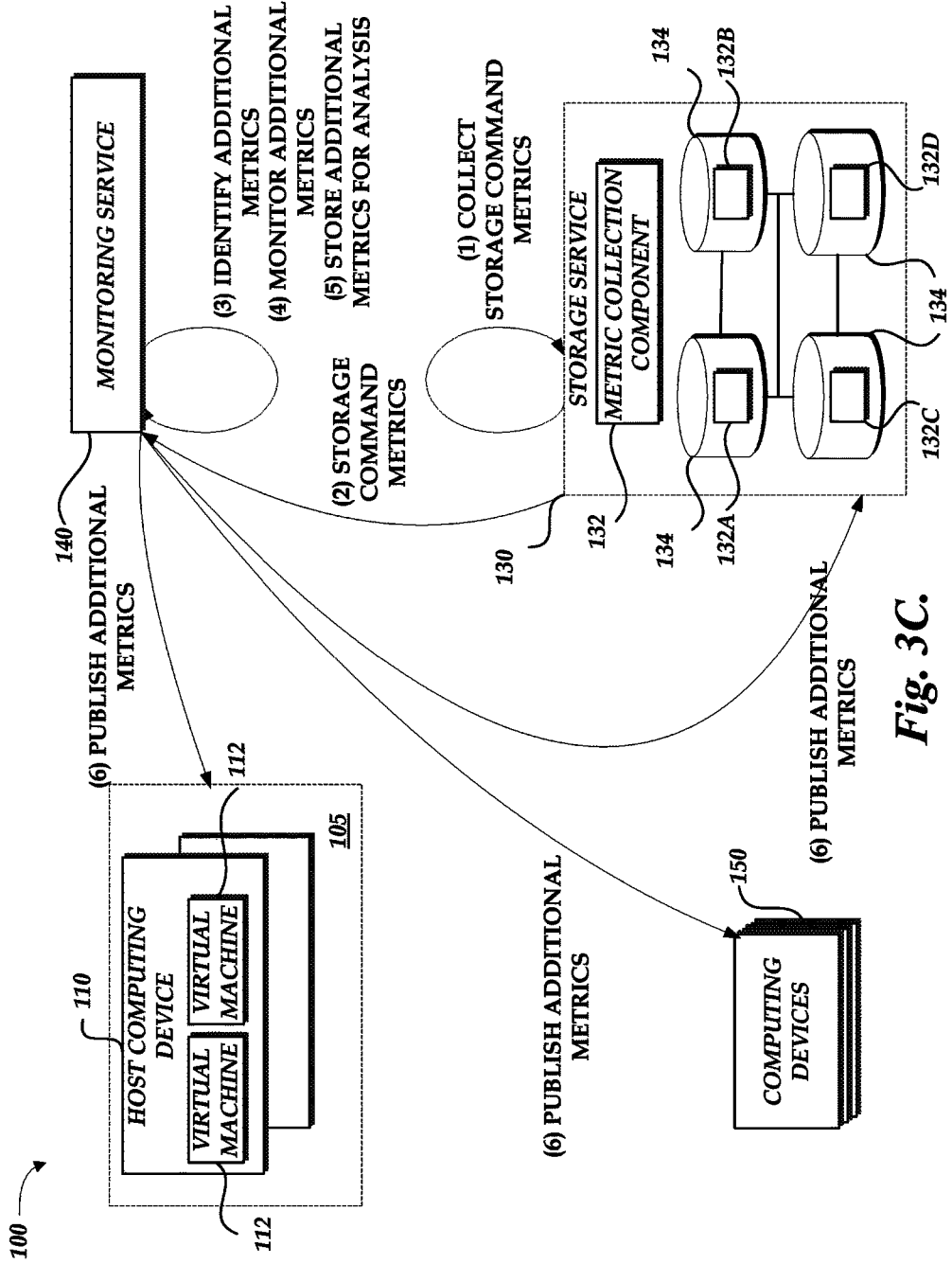
FIG. 3C is a block diagram the network topology of FIG. 1 illustrating a monitoring service identifying and monitoring additional metrics after receiving collected storage command metrics.

FIG. 3C is a block diagram the network topology of FIG. 1 illustrating a monitoring service identifying and monitoring additional metrics after receiving collected storage command metrics. In various embodiments, the correlation relationships identified by monitoring service 140 as described in FIG. 3B can indicate that further analysis is needed to identify the root cause of a storage system issue. Continuing in the example from above, if both storage elements of the identified correlation relationship indicated threshold breach, then monitoring service 140 can identify and monitor additional metrics for further analysis. At (1), storage service 130 collects storage command metrics. Storage command metrics can be obtained by storage service 130 from metric data store 208 (not depicted). In other embodiments, storage command metrics can be obtained dynamically as storage service 130 processes storage command requests. For example, in one embodiment, metric collection components 132A-132D can collect storage command metrics for each respective storage volume 134 in storage service 130. At (2), storage service 130 sends the storage command metrics to monitoring service 140. In one embodiment, storage service 130 may send storage command metrics to monitoring service 140 in response to a request from monitoring service 140 for additional metrics.

Next at (3), monitoring service 140 identifies additional metrics to be monitored. This identification can occur after monitoring service 140 determines that a correlation relationship indicates a root cause of a storage system issue. For example, if storage volume falls below a certain number of I/O read operations per second and the data center also falls below a certain number of I/O read operations per second, monitoring service 140 can identify that additional metric to be monitored can be an association with a customer account. In such a case, correlation relationships can be identified based on the customer account.

At (4), monitoring service 140 monitors the identified additional metric. For example, if several storage volumes in the data center fall below a certain number I/O read operations per second, as previously determined, and those several storage volumes are associated with the customer account, the root cause can be identified as the customer account, rather than the data center performing poorly as indicated by the number of I/O read operations per second for the data center. This conclusion can be confirmed by monitoring the customer account metric for the data center. If only a small percentage of the data center is used by that customer account, this can further indicate that the root cause is in fact the customer account, rather than poor performance at the data center. At (5), monitoring service 140 can store the additional metrics for further analysis. For example, the customer account metric can be processed to show a trend over time for both the data center and storage volumes associated with that customer account. If it is determined by either an operator of the monitoring service 140 or by monitoring service 140 itself that the identified correlation relationship trends over time, this can further indicate that the perceived root cause of a storage system issue (e.g. the number of read I/O operations falling below a threshold for the data center) is, in fact, an issue caused by the customer associated with the customer account. For example, the issue can be that the customer associated with the customer account is flooding the storage volumes with too many read I/O operation requests. Thus, identification of the root cause can be detailed with various metric aspects so that a root cause associated with failed read I/O operations (e.g., latency at the data center) is not erroneously identified.

Accordingly, a detailed analysis can be performed on the same storage volumes and data center that had an identified correlation relationship indicating a root cause (e.g., caused by a particular customer account). Additional metrics can be used or metric math can be used to determine whether a specific root cause is causing the faulty storage volumes. For example, additional metrics such as hardware diagnostics for a particular storage volume or the network diagnostics (e.g., number of hops, latency) can be used to cross-correlate against previous identified correlation processing results and/or narrow the set of identified correlation relationships. In such an example, a faulty storage volume can be viewed as an interesting entity. The additional metrics can be used to further scrutinize the characteristics of the interesting entity so that root causes can be further analyzed for the actual cause at the particular storage volume. For example, a network diagnostics metric can indicate that an already-identified faulty storage volume due to the customer account also has poor network diagnostics, for example, the latency at the identified faulty storage volume correlates poorly relative to the other identified faulty storage volumes at the same storage server. Accordingly, in this example, the root cause of the faulty storage volume may be the poor network diagnostics, rather than the customer account.

Still referring to FIG. 3C and considering another exemplary embodiment, at (3), monitoring service 140 can also identify additional metrics to be monitored based on short-term events, rather than solely based on the performance of storage command metrics or identified correlation relationships. Short-term events can include events related to storage volumes, for example, a storage volume that is attached to a virtual machine for a short period. Monitoring during the short period can be used to identify any issues with that storage volume. As another example, when an identified correlation relationship indicates that a root cause of a storage system issue can be associated with a particular metric (e.g., a customer account), detailed sub-minute metrics can be used to further monitor those relevant storage volumes for that short time period (e.g., less than a minute). With the sub-minute metrics, the monitoring service 140 can further analyze the sub-minute metrics for any anomalies or fine-tuning of a root cause. Components and attributes of additional metrics identified by monitoring service 140 for additional relationships and short-term events are further described below with respect to FIGS. 8A-8B.

Figure 3D:
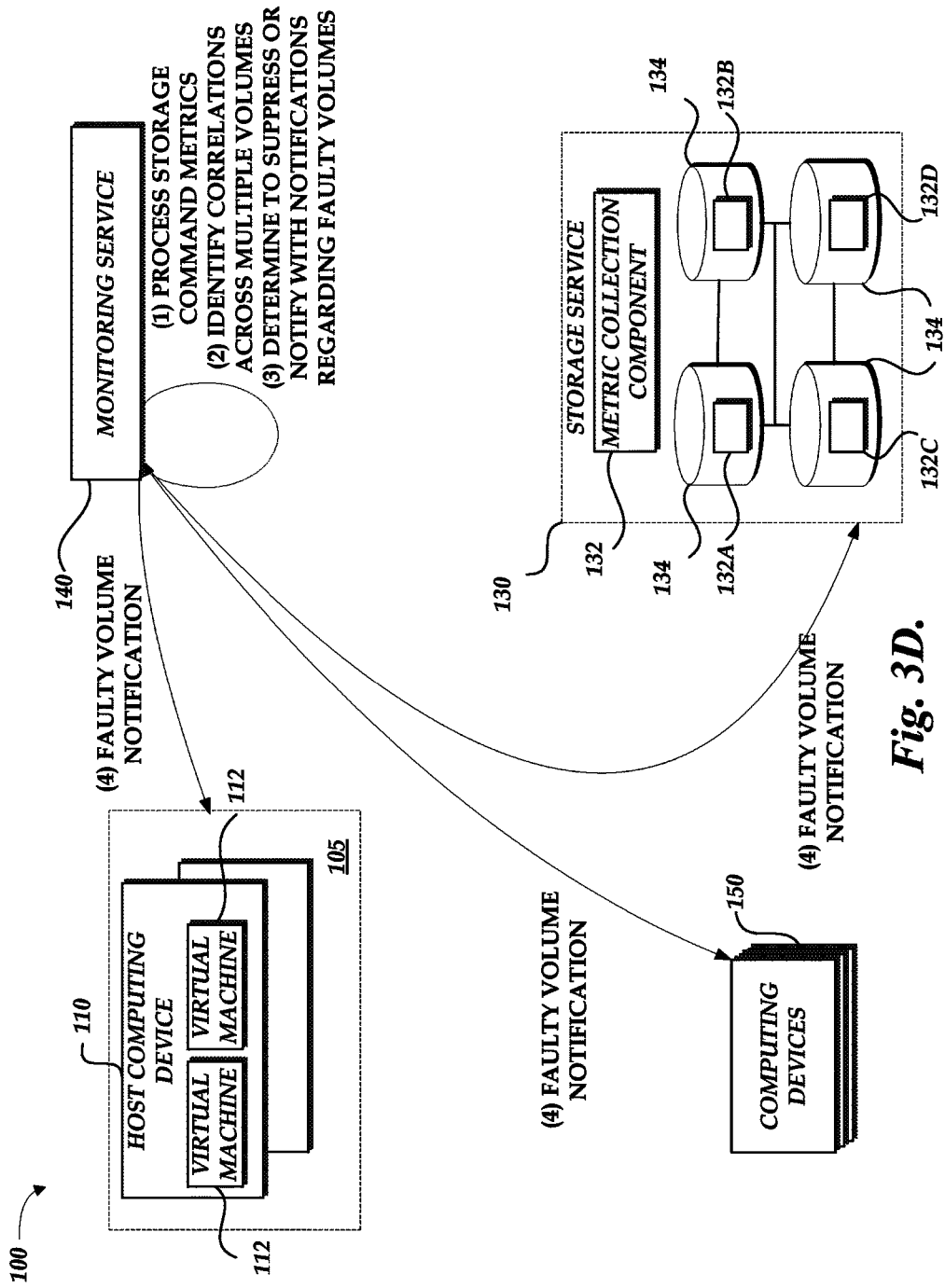
FIG. 3D is a block diagram the network topology of FIG. 1 illustrating a monitoring service processing storage command metrics across multiple storage volumes and determining whether to suppress or notify network entities regarding faulty volumes.

FIG. 3D is a block diagram the network topology of FIG. 1 illustrating a monitoring service 140 processing storage command metrics across multiple storage volumes and determining whether to suppress or notify network entities regarding faulty volumes. At (1), monitoring service 140 processes storage command metrics to perform a correlation between a storage volume 134 and another logical storage element of storage service 130. This processing indicates to monitoring service 140 that certain storage volumes are faulty. For example, as discussed above, monitoring service 140 can compare the number of I/O read operations per second at a particular storage volume with the number of I/O read operations per second at the storage server hosting the particular storage volume. Monitoring service 140 can continue to perform correlations between storage volumes and other storage levels. In some cases, the correlations can be performed in a tree approach with the storage volumes being correlated at a continually lower (or higher) logical storage level. With these correlation processing results, monitoring service 140 can then identify correlation relationships at (2). By identifying correlation relationships at multiple logical levels of the storage system, monitoring service 140 can use those identified correlation relationships to identify the faulty storage volumes. As described above, various thresholds can be used with the identified correlation relationships to find root causes of storage system issues. During this analysis, monitoring service 140 can also identify faulty storage volume that fall outside of desired performance metrics.

Next at (3), monitoring service 140 can determine whether to suppress or notify with notifications regarding faulty storage volumes. In various embodiments, monitoring service 140 can send notifications to the various storage entities in network 120. Monitoring service 140 can use various notification routines and suppression routines to suppress or notify the notifications. Components and attributes of the notification routines implemented by monitoring service 140 are further described below with respect to FIG. 5A. Additionally, components and attributes of the suppression routines implemented by monitoring service 140 are further described below with respect to FIG. 6. In some embodiments, a suppression rule associated with a suppression routine can include a specification that a notification for a determined storage system issue is to be suppressed. As an example, a faulty storage volume can be determined storage system issue. Thus, if a suppression rule identifies a faulty storage volume as being in a suppression category, then a notification regarding the faulty storage volume is suppressed.

Illustratively, a suppression category can be defined in terms of characteristics of a storage volume 134. The storage volume can have an identifier associated with it that indicates the storage volume is a recovered storage volume, a deleted volume, a lost volume, or a storage volume not currently associated with the storage processing service (e.g., the storage volume is not currently attached to a virtual machine 112). As another example, a suppression category can be a characteristic of a server hosting a storage volume 134. For example, the server can have an identifier associated with it that indicates the server is degraded server or a test server. If it is determined that the notification is to be issued regarding one or more faulty storage volumes, at (4), monitoring service 140 sends faulty volume notifications to host computing device 110, client computing device 150, and storage service 130. These entities or operators of those entities can then determine how the faulty storage volume should be handled or corrected. In some embodiments, such as in a software implementation of the notification system, notifications can be referred to as tickets.

Figure 4:
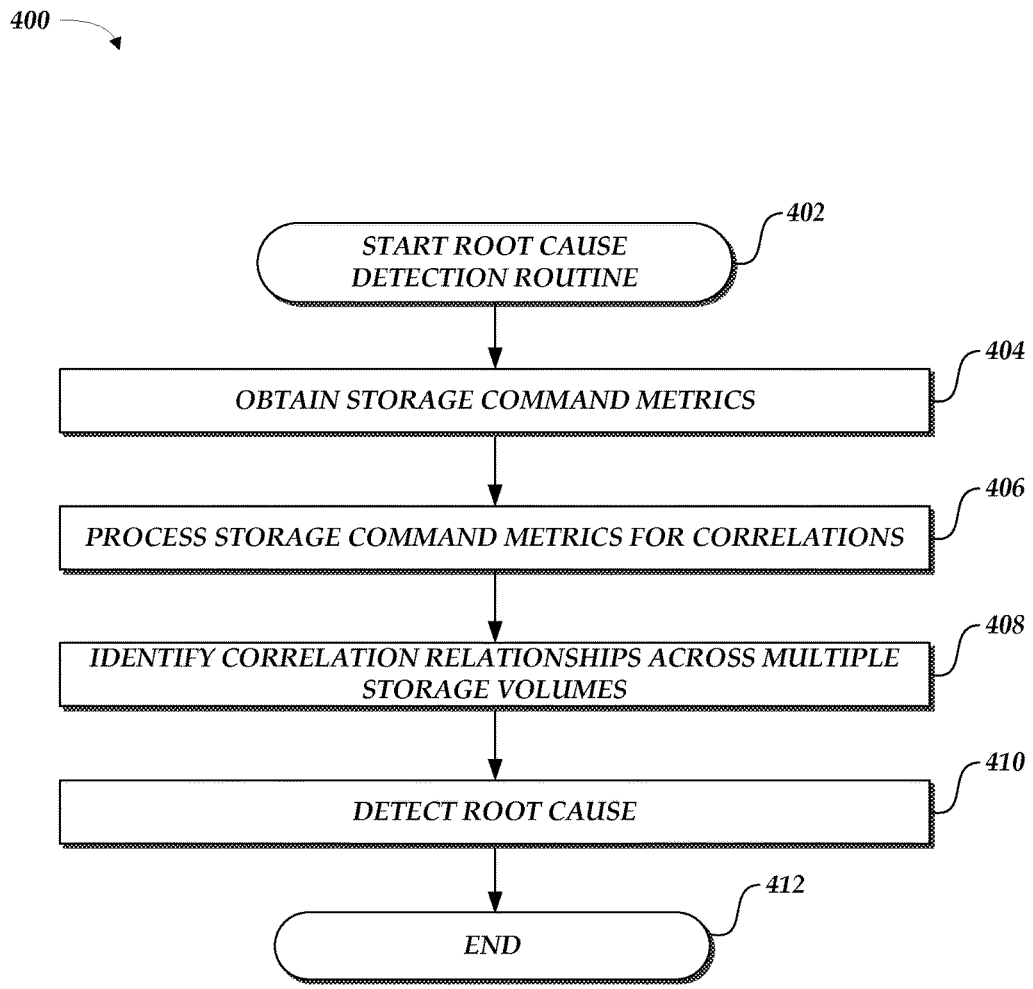
FIG. 4 is a flow diagram of an illustrative root cause detection routine implemented by a monitoring service.

FIG. 4 is a flow diagram of an illustrative root cause detection routine 402 implemented by a monitoring service. At block 404, storage command metrics are obtained from a storage service. In other embodiments, monitoring service 140 can obtain metrics from a data store within monitoring service 140 or any other network entity within network 120. In some embodiments, monitoring service 140 can send a request for metrics to storage service 130 or any other network entity with network 120. In this case, obtaining metrics can be seen as a response to the request sent by monitoring service 140. In one embodiment, monitoring service 140 can receive user input from an operator of the storage system through a user interface of monitoring service 140. Such user input can be received from an external computing device, as described above, associated with monitoring service 140. For example, the received user input can be translated into a request for metrics.

Next, at block 406, the storage command metrics are processed for correlations. For example, as described above with respect to FIG. 3B, correlation processing results can be generated for various storage volumes. Correlation processing results can be generated for each logical storage element located at a lower logical storage level as compared to hierarchal logical storage element at the higher logical storage level. Correlation processing results can also be generated for higher levels that are more than a degree of freedom from an initial lower logical storage element. For example, monitoring service 140 can compare the average queue length (e.g., a normalized queue length) at a data center hosting the storage volumes with the queue length at each of those storage volumes. As can be seen from this description, various combinations of processing correlation processing results, among storage volumes and respective logical storage components, are possible.

Then, at block 408, the correlation processing results can be used to identify correlation relationships across multiple storage volumes. Correlation processing results for a particular storage volume can be compared with various logical storage elements of the storage system to identify a correlation relationship. For example, the average queue length at the particular storage volume can be compared to the average queue length at the storage server hosting that particular storage volume to generate a correlation processing result. That is, a relationship from the set can indicate that the storage server and a particular storage volume are correlated with respect to a certain metric (e.g., average queue length). Continuing in the same example, the correlation processing results generated from comparing the storage server hosting the particular storage volumes with the storage volumes themselves can be used to identify a first set of relationships. That is, each storage volume bears a correlation relationship with the storage server hosting that storage volume, which is the first set of relationships. In addition, more correlation processing results can be generated from comparing the data server that is hosting the particular storage volume, which identifies a second set of relationships. In turn, both the first and the second set of relationships can be used to identify a correlation relationship between the particular storage volume and the data center. As another example, a relationship among logical storage components at the same level can be identified: a first and second storage rack components can a correlated fault (e.g., faulty storage volumes hosted on the same physical storage computing device). Monitoring service 140 can also use priorities to determine which correlation relationships are to be identified first. Other aspects of using priorities to identify correlation relationships are discussed above with respect to FIG. 3B.

Continuing in routine 402, at block 410, a root cause is detected. For example, a root cause of a storage system issue can be detected from the correlation information. By analyzing several metrics from various storage volumes with a particular logical storage entity, a root cause can be attributed to either the logical storage entity or specific faulty storage volumes. For example, continuing in the same example from block 408, the identified correlation relationship between the particular storage volume and the storage server can indicate, when compared to the relationships of the various other storage volumes hosted on that storage server, that the particular storage volume has an abnormal average queue length. That is, the identified correlation relationship indicates that the average queue length at that particular storage volume is different than the average queue length at the various other storage volumes hosted on that storage server. As another example, an absence of I/O operations can be caused by a cut fiber optic cable between a host computing device and a data center. In various embodiments, monitoring service 140 can detect the root cause of a storage system issue using a threshold comparison. For example, as described above with respect to FIG. 3B, the threshold can be a trailing average focused on a certain metric for a certain period of time. Upper bands and lower bands can also be used as thresholds. In some cases, as described below with respect to FIGS. 8A and 8B thresholds can be updated or generated from additionally identified relationships. Because correlated relationships can be based on various storage command metrics, various thresholds are also possible. Accordingly, monitoring service 140 can use storage command metrics to determine whether the root cause of a storage system issue is attributed to a particular storage system component. Thereafter, at block 412, routine 402 ends.

In various embodiments, routine 402 may be performed by a monitoring service 140 of a storage system. In other embodiments, a physical computing device with computer-executable instructions may cause the computing device to perform routine 402. In some embodiments of the routine 402, elements may occur in sequences other than as described above. In such embodiments, the routine 402 may, for example, omit block 404. Accordingly, metrics can be dynamically provided to a monitoring service 140; or, in another embodiment, the metrics can be collected by the monitoring service 140 from a storage service 130. One skilled in the art will appreciate that additional variations are possible and within the scope of the present disclosure.

Figure 5A:
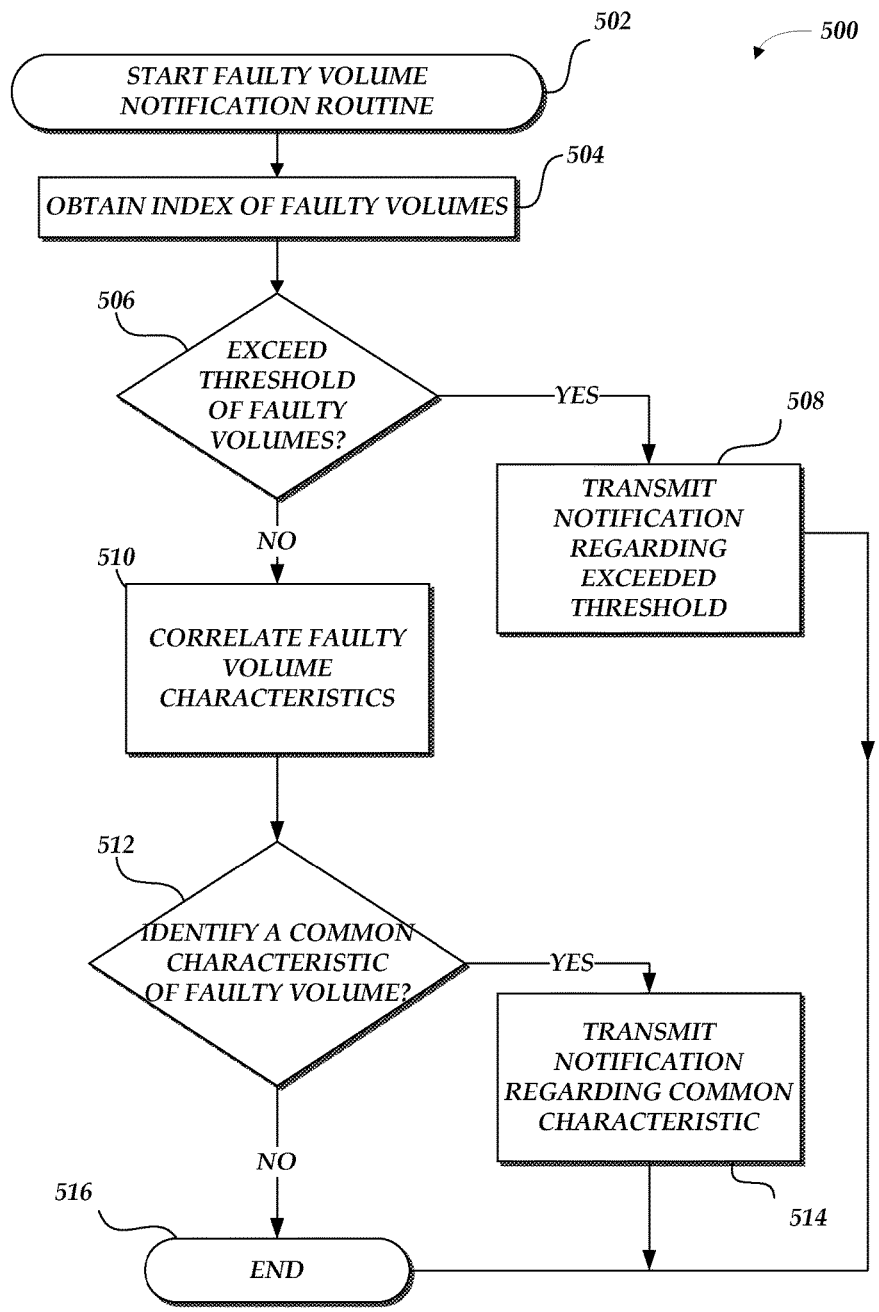
FIG. 5A is a flow diagram of an illustrative faulty volume notification routine implemented by a monitoring service.
Figure 5B:
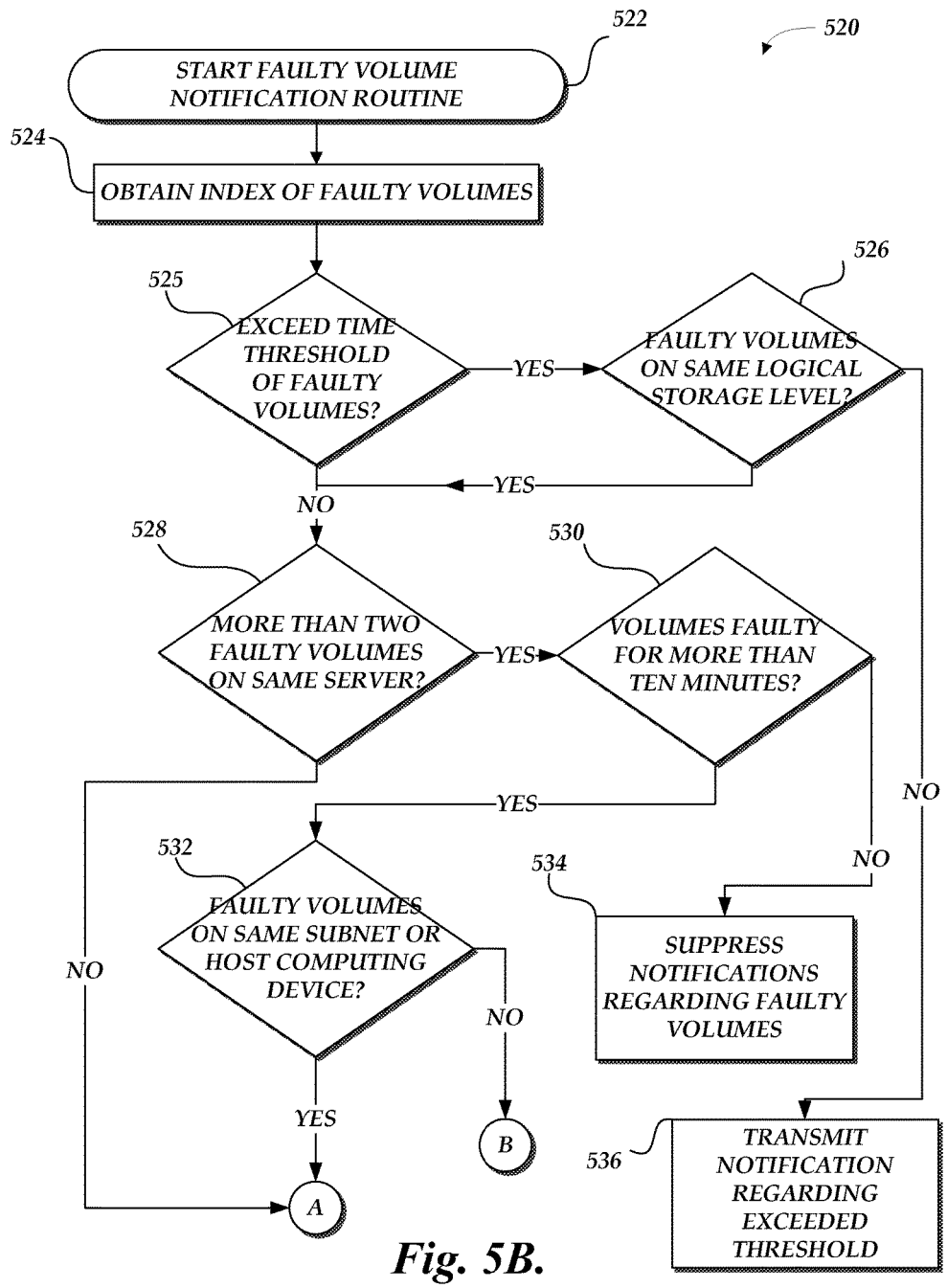
FIGS. 5B-5F are a flow diagram of an illustrative faulty volume notification routine implemented by a monitoring service.
Figure 5C:
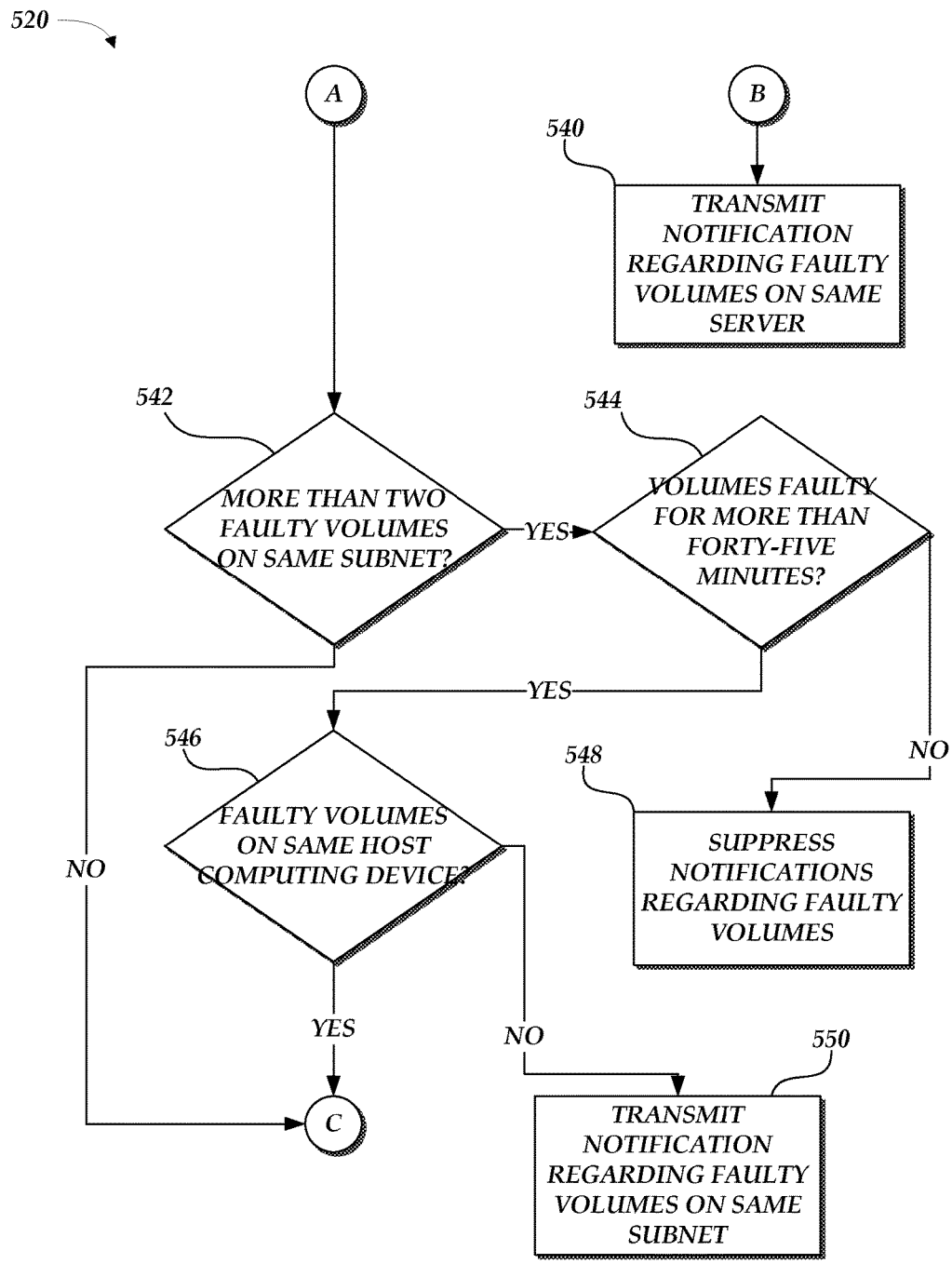
Figure 5D:
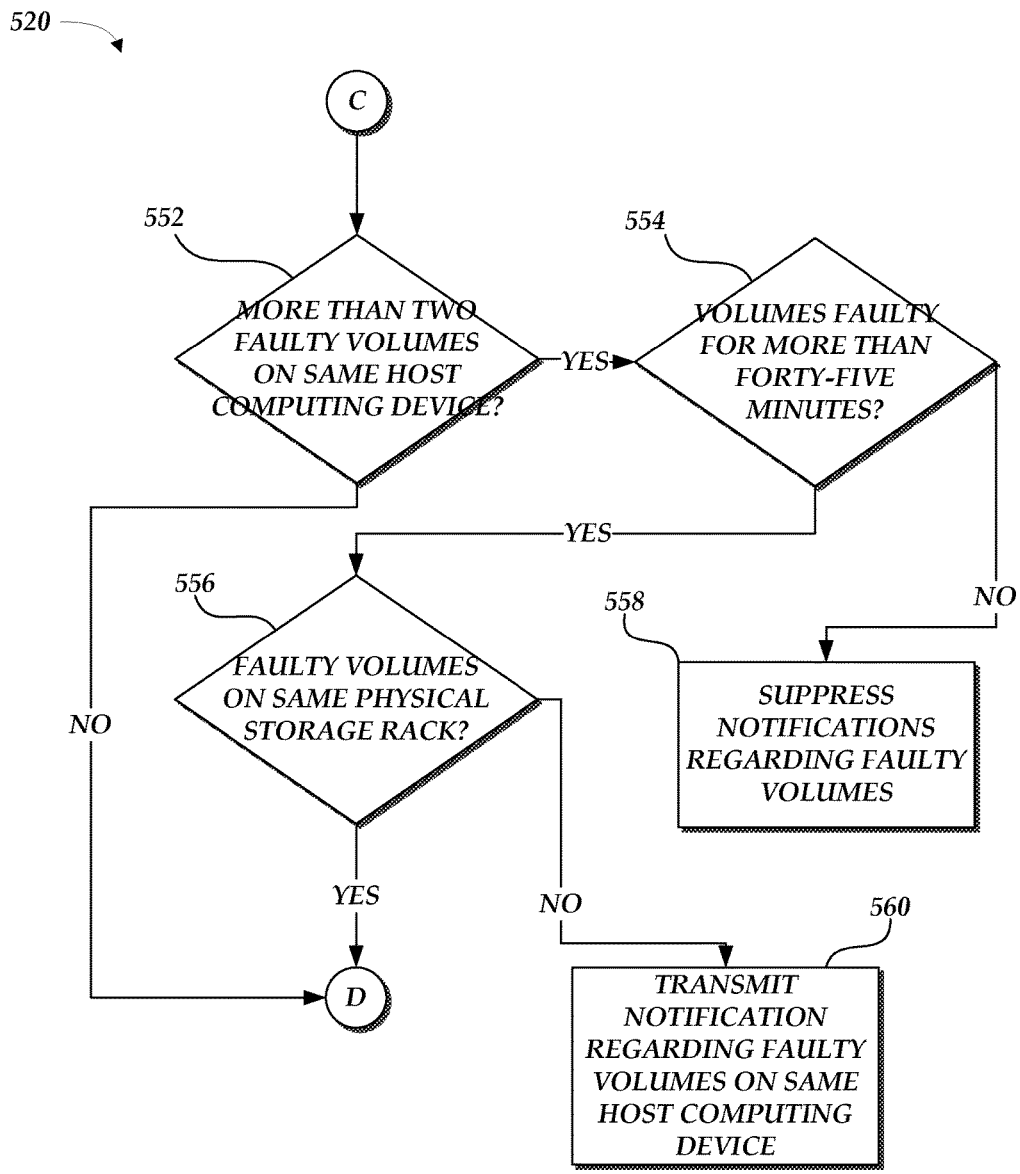
Figure 5E:
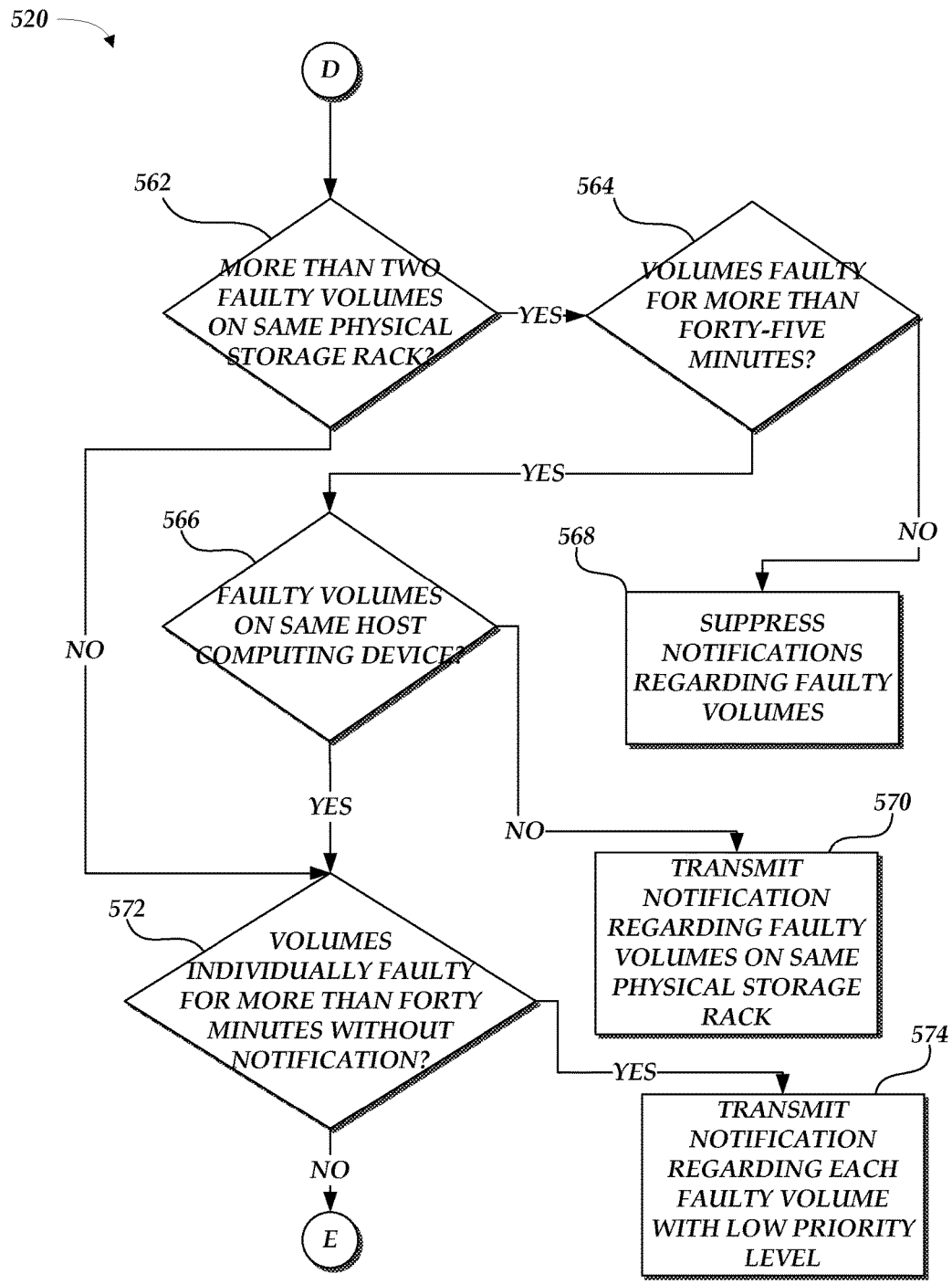
Figure 5F:
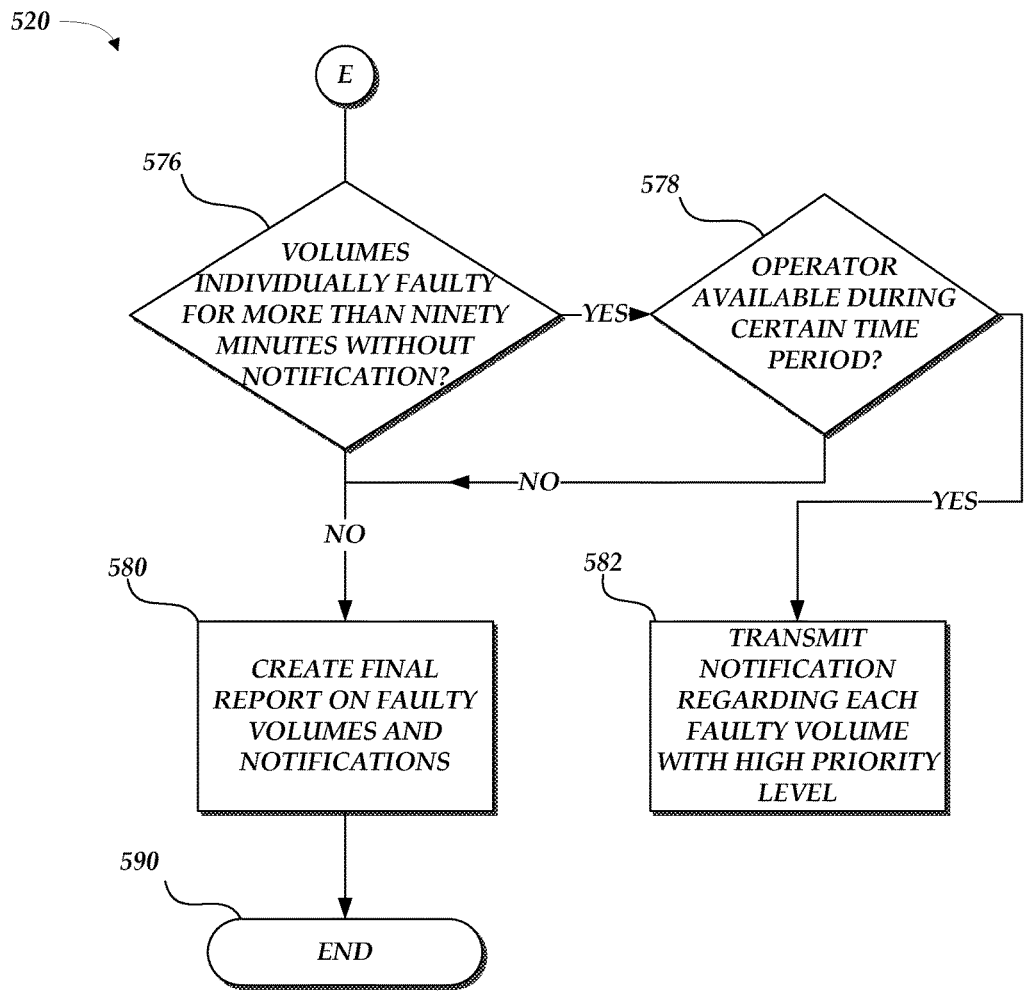

FIG. 5A is a flow diagram of an illustrative faulty volume notification routine 502 implemented by a monitoring service 140. At block 504, an index of faulty storage volumes is obtained. For example, the monitoring service 140 can obtain the index of faulty storage volumes from threshold comparisons with storage command metrics. Or as another example, monitoring service 140 can obtain the index of faulty storage volumes from identified correlation relationships. When processing correlation results, the monitoring service can determine which storage volumes are faulty as described above with respect to FIG. 3B.

Next at decision block 506, the number of volumes in the index of faulty storage volumes is compared with a threshold. If the quantity of faulty storage volumes exceeds the threshold, the routine 502 proceeds to block 508. At block 508, a notification regarding the exceeded threshold is transmitted. In some embodiments, transmitting the notification regarding the exceeded threshold can also be referred to as being issued. This notification can be transmitted to another component of monitoring service 140, for example, to metric data store 208, where an operator of the monitoring service 140 can retrieve this notification regarding the exceeded threshold. For example, the operator of the storage system can receive a notification on a user interface associated with monitoring service 140. In various embodiments, the user interface can be an external computing device associated with monitoring service 140 and part of network 120. Such external computing devices include, but are not limited to, laptops, personal computers, tablet computers, personal digital assistants (PDAs), hybrid PDA/mobile phones, mobile phones, electronic book readers, digital media players, wearable computing devices, integrated components for inclusion in computing devices, appliances, electronic devices for inclusion in vehicles or machinery, gaming devices, set top boxes, electronic devices for inclusion in televisions, and the like. These external computing devices may be associated with any of a number of visual, tactile, or auditory output devices, and may be associated with a number of input devices for user input, including, but not limited to, keyboards, mice, trackballs, trackpads, joysticks, input tablets, trackpoints, touch screens, remote controls, game controllers, motion detectors and the like. With any of these external computing devices, the notification can be displayed on the user interface, for example a website is displayed on a browser using the external computing device. In a website embodiment, the notification can be viewed as a status update of the faulty storage volumes. In various embodiments, the status update can be filtered according to various characteristics of the faulty storage volumes (e.g., logical storage component, storage system issue, or customer account).

In one embodiment, the notification issued at block 508 can correspond to an indication that a large scale event in the storage system has occurred. In various embodiments, the notification can be issued by a notification component such as notification component 204 depicted in FIG. 204. Thereafter, at block 516, routine 502 ends.

If, however, at decision block 506, the quantity of faulty storage volumes does not exceed the threshold, the routine proceeds to block 510. At block 510, for each faulty storage volume obtained from the index of faulty storage volumes, a faulty storage volume is correlated at multiple logical storage levels of a storage system with other faulty storage volumes. For example, a correlation pattern can follow a tree-based decision format: storage volumes are correlated to determine whether they are faulty on the same master slave/server; then, storage volumes are correlated to determine whether they are faulty on the same server subnetwork; then, storage volumes are correlated to determine whether there faulty on the same physical computing device; and finally, storage volumes are correlated to determine whether there faulty on the same logical grouping of storage volumes on that physical computing device. The multiple logical levels of a storage system can be viewed as characteristics of the faulty storage volumes. Other characteristics are possible. As but one example, another characteristic of faulty storage volumes can be their associated hardware such as a particular processing chip. In another embodiment, a characteristic of faulty storage volumes can be the version of software with which they have been imaged or provisioned (e.g., by a virtual machine device instance).

Continuing in routine 502, at decision block 512, monitoring service 140 determines whether a common characteristic of a group of faulty storage volumes is identified. A group can be two faulty storage volumes. For example, as part of the tree-based decision format, monitoring service 140 may determine that the group of faulty storage volumes shares the same master/slave server. If so, the routine proceeds to block 514. Variations of this determination are possible. For example, the determination may also comprise a determination regarding whether the group of faulty storage volumes also share a logical level lower than the logical level identified as a common characteristic. If a lower logical level is not shared, then the notification regarding the group of faulty storage volumes sharing a common characteristic may still be issued at block 514. If, however, a lower logical level is shared, then a notification may be issued regarding that shared lower logical level. Continuing in the same example, this may be that the shared lower logical level is a logical grouping of storage volumes on a physical computing device. The routine 502 can iterate in this fashion until the lowest shared logical level is determined, and the routine 502 proceeds to block 514, only issuing a notification regarding that shared lower logical level as the common characteristic.

At block 514, a notification regarding the common characteristic is transmitted. This notification can be transmitted to another component of monitoring service 140, for example, to metric data store 208, where an operator of the monitoring service 140 can retrieve this notification regarding the group of faulty storage volumes sharing a common characteristic. In one embodiment, the notification issued at block 508 can correspond to an indication that a large scale event in the storage system has occurred. In various embodiments, the notification transmitted or issued can be issued according an associated severity level of a storage system issue. For example, a low severity level can correspond to two or three faulty storage volumes being at fault for a short time (e.g., ten minutes). In such an instance, before transmitting the notification at block 514, additional metrics can be obtained to further analyze the issue or automated fixes can be applied to the fault. As another example, a low severity level can corresponds to a few faulty storage volumes (e.g., two or three storage volumes) on a specific server. In this case, similarly, automated server fixes can be applied or additional metrics obtained regarding that specific server before transmitting the notification at block 514. If a low severity level issue is fixed by an automated solution, then no notification may be transmitted at block 514. As another example, a high severity level can correspond to several storage volumes being at fault across various logical storage components (e.g., multiple storage servers). Or as another example, a high severity level can correspond to several storage volumes (e.g., ten or more) being at fault for a long period of time (e.g., over ninety minutes). In some cases, these varying severity levels can be viewed as a hierarchal system where notifications are issued according to a severity level of the storage system issue (e.g., faulty storage volumes). Various severity levels are possible.

In various embodiments, additional severity levels can exist in such a system with varying characteristics. For example, severity levels can be defined by monitoring service 140 dynamically or by an operator of the monitoring service 140. The severity level associated with a storage system issue can also indicate that the notification is to be issued at a corresponding priority level to the severity level. Accordingly, the issued notification can indicate a priority level to an operator of monitoring service 140 or an operator of storage service 130. In one embodiment, an operator can be a team of people managing the relevant network entity. Or, in another embodiment, an operator can be a particular organization that manages the monitoring service 140 or storage service 130. Thereafter, at block 516, routine 502 ends.

In some embodiments, before issuing or transmitting the notification at block 508, monitoring service 140 may compare the group of faulty storage volumes with a time threshold. The time threshold can correspond to a time allowed for the group of faulty storage volume to be at fault (e.g., either slow or faulty as define above). If the group of faulty storage volume exceeds the time threshold (e.g., ten minutes for a master/slave server), a notification may still be issued regarding the group of faulty storage volumes sharing a common characteristic. Varying common characteristics can change the time threshold. As an example, if the shared common characteristic is a subnetwork, the time threshold may correspond to forty-five minutes. Other time thresholds are possible. A slack time for each time threshold is also possible. If the time threshold corresponds to thirty minutes, then a slack time of two minutes (e.g., being at fault for twenty-eight minutes) for one faulty storage volume in the group can still allow the group to breach the time threshold. Slack times allow a slight variation in the threshold if the monitoring service 140 or an operator of a storage system were to decide that a slack time may affect how efficiently the storage system is operating.

If, however, at decision block 512, the monitoring service identifies no common characteristic, the routine proceeds to block 516 and routine 502 ends. In various embodiments, before ending when no common characteristic is identified, the monitoring service may still compare the index of faulty storage volumes, each individually, with an individual time threshold. In various embodiments, a threshold can correspond to a maximum number of faulty storage volumes. Or, in another embodiment, the individual time threshold can correspond to a time allowed for a faulty storage volume to be at fault (e.g., either slow or faulty as define above). If a faulty storage volume exceeds the individual time threshold (e.g., ninety minutes), a notification may still be issued regarding that single faulty storage volume. In one embodiment, a final report of the individual faulty storage volumes can be issued by the monitoring service.

In various embodiments, routine 502 may be performed by a monitoring service 140 of a storage system. In other embodiments, a physical computing device with computer-executable instructions may cause the computing device to perform routine 502. In some embodiments of the routine 502, elements may occur in sequences other than as described above. In such embodiments, the routine 502 may, for example, omit decision block 506 and block 508. Accordingly, notifications can be issued by monitoring service 140 without first determining whether an excessive amount of faulty storage volumes exist. Such a case might occur if it is already been determined by monitoring service 140 that a large-scale event has occurred, for example, by identifying an additional relationship as described below with respect to FIGS. 8A and 8B. One skilled in the art will appreciate that additional variations are possible and within the scope of the present disclosure.

FIGS. 5B-5F are a flow diagram of an illustrative faulty volume notification routine 522 implemented by a monitoring service 140. At block 504, an index of faulty storage volumes is obtained. For example, the monitoring service 140 can obtain the index of faulty storage volumes from threshold comparisons with storage command metrics. Or as another example, monitoring service 140 can obtain the index of faulty storage volumes from identified correlation relationships. When processing correlation results, the monitoring service can determine which storage volumes are faulty as described above with respect to FIG. 3B.

Blocks 525, 526, and 536 illustrate decisions and processes that monitoring service 140 implements to determine whether several faulty storage volumes have been faulty at a certain logical level for a time period exceeding a time threshold. Blocks 528, 530, 532, 534, and 540 illustrate a decisions and processes that monitoring service 140 implements as part of the faulty volume notification routine 522 at a server logical storage level. For example, decision blocks 528 and 530 determine whether the faulty storage volumes are on the same server and whether those same faulty storage volumes have exceeded a time threshold (e.g., ten minutes). Decision block 532 determines whether the same faulty storage volumes are being hosted on the same subnet (e.g., the server subnet) or the same host computing device. As can be seen from the flow depicted in FIG. 5B various decisions and notifications are possible at this logical storage level when issuing notifications. Routine 522 follows this tree-based decision block logic, with the flow proceeding from a higher logical storage level to a lower logical storage level at each iteration.

Next, at blocks 542, 544, 546, 548, and 550, monitoring service 140 implements decision blocks and processes at a subnet logical storage level. For example, decision blocks 542 and 544 determine whether the faulty storage volumes are on the same subnet and whether those same faulty storage volumes have exceeded a time threshold (e.g., forty-five minutes). Decision block 546 determines whether the same faulty storage volumes are being hosted on the same host computing device. As can be seen from the flow depicted in FIG. 5C, various decisions and notifications are possible at this logical storage level when issuing notifications.

Next, at blocks 552, 554, 556, 558, and 560, monitoring service 140 implements decision blocks and processes at a host computing device logical storage level. For example, decision blocks 552 and 554 determine whether the faulty storage volumes are on the same host computing device and whether those same faulty storage volumes have exceeded a time threshold (e.g., forty-five minutes). Decision block 556 determines whether the same faulty storage volumes are being hosted on the same physical storage rack. As can be seen from the flow depicted in FIG. 5D, various decisions and notifications are possible at this logical storage level when issuing notifications.

Next, at blocks 562, 564, 566, 568, 570, 572, and 574, monitoring service 140 implements decision blocks and processes at a physical storage rack logical storage level. For example, decision blocks 562 and 564 determine whether the faulty storage volumes are on the same physical storage rack and whether those same faulty storage volumes have exceeded a time threshold (e.g., forty-five minutes). Decision block 566 determines whether the same faulty storage volumes are being hosted on the same host computing device. As can be seen from the flow depicted in FIG. 5E, various decisions and notifications are possible at this logical storage level when issuing notifications.

Then, at blocks 576, 578, 580, and 582, monitoring service 140 implements decision blocks and processes for faulty storage volumes that are not correlated at any of the foregoing logical storage levels. At block 582, a notification is transmitted regarding these faulty storage volumes at a high priority level. Finally, at block 580, a final report is created about the faulty storage volumes and any notifications issued during processing of routine 502. Thereafter, at block 590, routine 522 ends.

In various embodiments, routine 522 may be performed by a monitoring service 140 of a storage system. In other embodiments, a physical computing device with computer-executable instructions may cause the computing device to perform routine 522. In some embodiments of the routine 522, elements may occur in sequences other than as described above. In such embodiments, the routine 502 may, for example, omit blocks 542, 544, 546, 548, and 550. Accordingly, the flow of routine 522 will proceed to the next lower logical storage level without implementing decisions and processes at the subnet logical storage level. One skilled in the art will appreciate that additional variations are possible and within the scope of the present disclosure.

Figure 6:
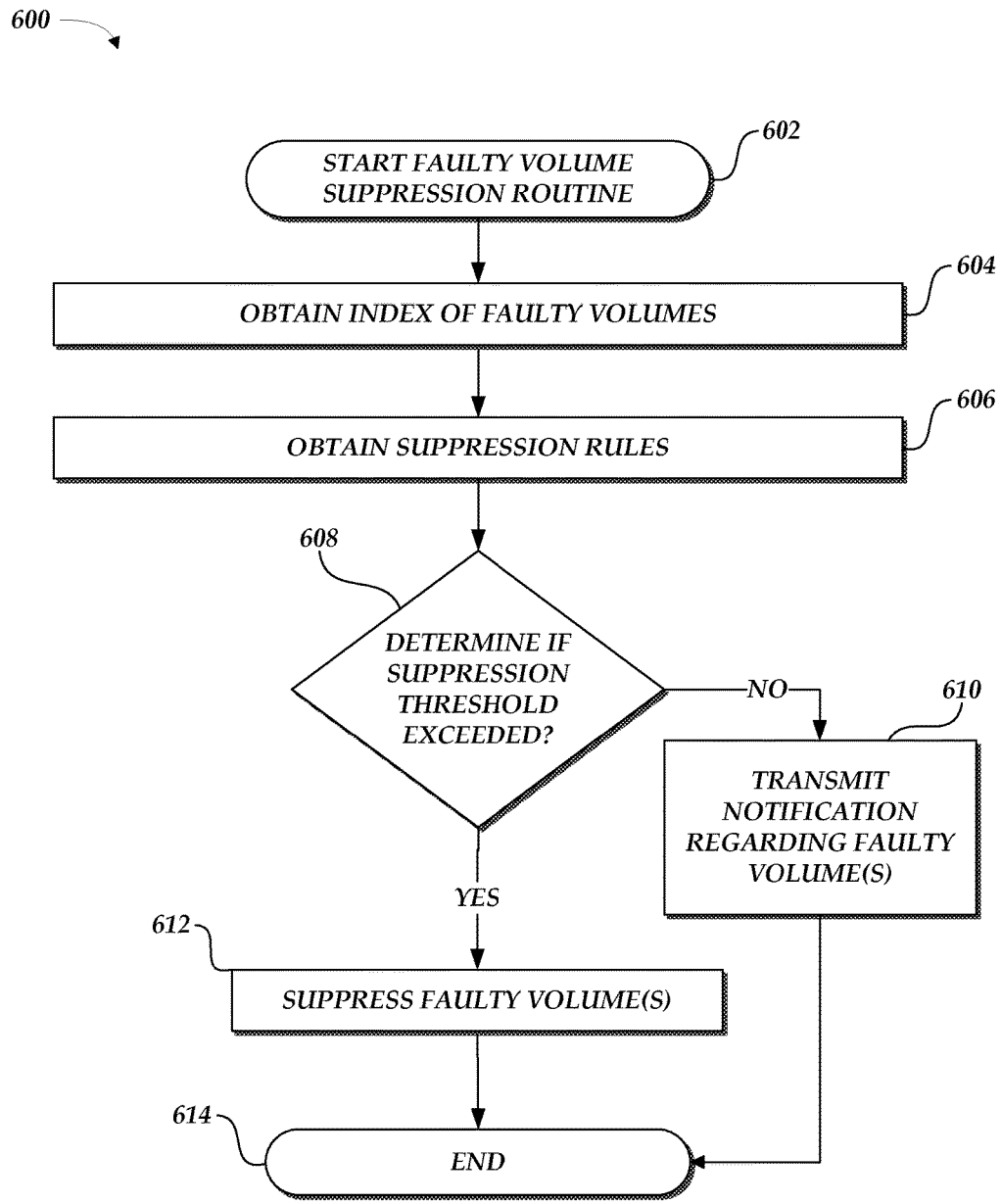
FIG. 6 is a flow diagram of an illustrative faulty volume suppression routine implemented by a monitoring service.

FIG. 6 is a flow diagram of an illustrative faulty volume suppression routine 602 implemented by a monitoring service. At block 604, an index of faulty storage volumes is obtained. For example, the monitoring service 140 can obtain the index of faulty storage volumes from threshold comparisons with storage command metrics. Or as another example, monitoring service 140 can obtain the index of faulty storage volumes from identified correlation relationships. When processing correlation results, the monitoring service can determine which storage volumes are faulty as described above with respect to FIG. 3B.

Next at block 606, suppression rules are obtained. In various embodiments, suppression rules can be referred to as suppression thresholds. For example, a suppression threshold can correspond to a suppression category identifier of a storage volume. A suppression category can be a storage volume on a degraded server, a storage volume on a test server, a recovered storage volume, a deleted volume, a lost volume, or a storage volume not currently associated with the storage processing service (e.g., the storage volume is not currently attached to a virtual machine 112). A suppression threshold can also be an indication that a group of storage volumes share the same logical storage grouping. Suppression rules can also be modified and/or defined by users. An operator of the storage system can input a time period for suppression. Then, notifications about that faulty storage volume (or a group) can be suppressed for that corresponding time period. As another example, suppression rules can be dynamically or automatically defined by the storage system. Storage command metrics can indicate via correlation relationships that a particular server is experiencing a large scale event (e.g., a power outage). Accordingly, a suppression rule can be defined that suppresses notifications regarding faulty storage volumes hosted on that particular server.

Suppression rules can also be defined for known storage system issues (e.g., a power outage is known ahead of time). In some cases, a known storage system issue can be a large scale event for a geographic region. For example, data centers in a particular region are receiving an upgrade, and will, thus, experience an outage for a specified period of time.

With these suppression rules, at block 608, monitoring service 140 determines whether a suppression threshold has been exceeded. Generally speaking, this can be referred to as determining whether a suppression rule applies to the faulty storage volumes. If a threshold has not been exceeded, routine 602 proceeds to block 610 and issues a notification regarding the faulty storage volumes. In various embodiments, the notification can be issued as described above with respect to FIG. 5A. Thereafter, at block 614, routine 602 ends.

If, however, at block 608, a suppression threshold has been exceeded, routine 602 proceeds to block 612. As can be seen from this description, a suppression threshold can be exceeded in variety of ways. For example, a faulty storage volume can have an identifier that indicates it is a test volume. Or, as another example, a faulty storage volume can be associated with a known system issue (e.g., a large scale event). In another embodiment, the suppression rule can be applied to a group of faulty storage volumes, if is determined that the group is at fault for a time greater than a time threshold. Aspects of the time threshold are described above with respect to FIG. 5A.

At block 612, monitoring service 140 suppresses the faulty storage volume. This can include suppressing any notification regarding the faulty storage volume that was to be issued. In some embodiments, suppressing the faulty volume may also include discontinuing monitoring of the faulty storage volume for a period of time specified by the suppression rule or an operator of the monitoring service 140. Thereafter, at block 614, routine 602 ends.

In various embodiments, routine 602 may be performed by a monitoring service 140 of a storage system. In other embodiments, a physical computing device with computer-executable instructions may cause the computing device to perform routine 602. In some embodiments of the routine 602, elements may occur in sequences other than as described above. In such embodiments, the routine 602 may, for example, omit block 604. Accordingly, metrics can be dynamically provided to a monitoring service 140; or, in another embodiment, the metrics can be collected by the monitoring service 140 from a storage service 130. One skilled in the art will appreciate that additional variations are possible and within the scope of the present disclosure.

Figure 7:
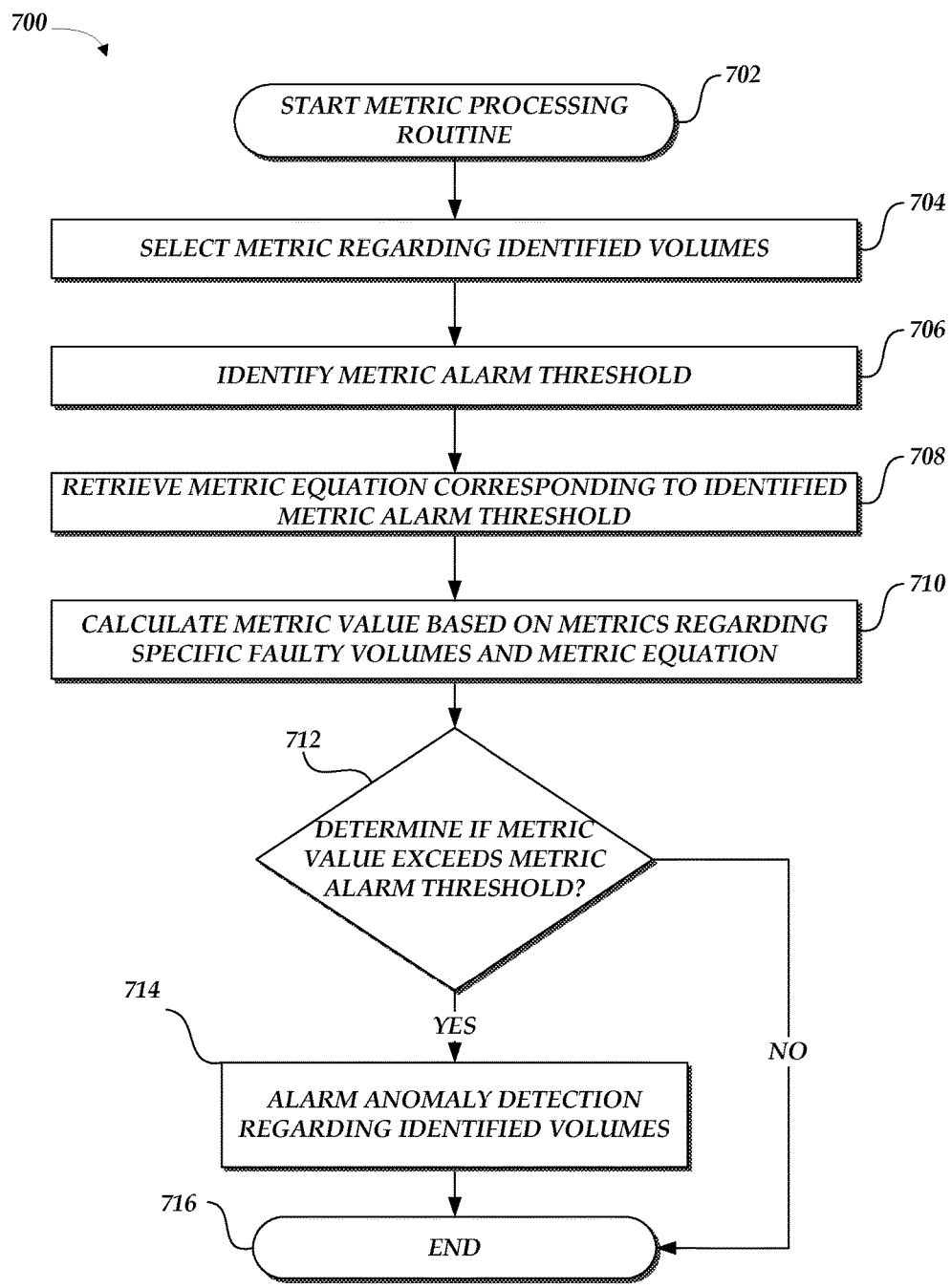
FIG. 7 is a flow diagram of an metric processing routine implemented by a monitoring service.

FIG. 7 is a flow diagram of a metric processing routine 702 implemented by a monitoring service. At block 704, storage volumes are identified for metric processing. A corresponding metric is selected for the identified storage volumes. As described above with respect with respect to FIG. 3A, various metrics can be collected. Such metrics can also have associated alarms or thresholds. Next, at block 706, a metric alarm threshold is identified. For example, an alarm threshold can correspond to a single metric: the server service time falls below a certain threshold. Or as another example of a single metric, a slow storage volume can have alarm thresholds for different categories: normal, degraded, or severely degraded. As another example, multiple metrics can be used to define an alarm threshold: a faulty storage volume as defined above includes three metrics: the number of read I/O operations per second; the number of write I/O operations per second; and the queue length for those read and write I/O operations.

Next, at block 708, monitoring service 140 can retrieve a metric equation corresponding to the identified metric alarm threshold. Continuing in the same example as above, a single metric alarm threshold can have an associated metric equation. Slow storage volumes can be defined according to their effective throughput in terms of the average service time for an I/O operation. A metric equation can be retrieved to calculate the effective throughput. To accomplish this, the selected metric at block 704 can be the average service time for an I/O operation.

Continuing in routine 702, at block 710, monitoring service 140 can calculate a metric value using the selected metrics for the identified volumes and the retrieved metric equation. Continuing in the same example using the equation for a slow volume, a constant can be multiplied or divided by the retrieved metric regarding the average service time for an I/O operation. The calculated value will be the effective throughput of that identified storage volume.

As another example of a single metric, the number of storage volumes in availability zone can be calculated by using a trailing average equation. A metric can, retrieved at block 708, track the number of attached volumes by taking an average over in availability zone. Then, at block 710, the trailing average can be calculated over each week to yield a normalized metric value. Accordingly the metric value will be between 0 and 1. As but another example, a metric value can be calculated using multiple metrics. Continuing in the same example using the equation for a faulty volume, a metric value can be calculated using comparisons of multiple metrics. Thus, if 1) the number of read I/O operations per second and the number of write I/O operations per second both equal zero and if 2) the queue length for those read and write I/O operations is greater than one, the metric value is calculated to be a logical one. Accordingly, that storage volume with those metrics can be defined as a faulty storage volume according to this equation.

At block 712, monitoring service 140 determines whether the metric value exceeds the metric alarm threshold. Continuing in the example of the slow storage volume, the various alarm threshold categories for the slow volume are compared to the metric value. For example, if the effective throughput expressed as a percentage is between 50% and 100%, the storage volume is a slow storage volume that is degraded. If the effective throughput expressed as a percentage is less than 50%, the storage volume is a slow storage volume that is severely degraded. Otherwise the storage volume is considered normal. In some embodiments, the slow storage volume definition can include an additional metric related to the queue length. In these embodiments, each alarm threshold category may have an additional comparison that includes the queue length. As but one example, a slow storage volume that is degraded may have a queue length that is between one and fifty I/O read and write operations per second. Continuing in the example of the faulty volume, the logical one value indicates that the metric alarm threshold has been exceeded or breached. Accordingly, in both the cases of the slow volume and the faulty volume, routine 702 proceeds to block 714. If, however, monitoring service 140 determines the metric value does not exceed the metric alarm threshold, routine 702 proceeds to block 716. Thereafter, at block 716, routine 702 ends.

At block 714, monitoring service 140 alarms that anomaly has been detected for the volumes with calculated metric values that have been determined to be slow or faulty volumes. That is, the volumes identified with the calculated metric values have been determined to be an anomaly. In various embodiments, monitoring service 140 may alarm operator of the storage system or another entity of the network 120 such as storage service 130. Monitoring service 140 can implement the alarm as a notification routine and suppression routines such as described above with respect to FIGS. 5 and 6. Thereafter, at block 716, routine 702 ends.

In various embodiments, routine 702 may be performed by a monitoring service 140 of a storage system. In other embodiments, a physical computing device with computer-executable instructions may cause the computing device to perform routine 702. In some embodiments of the routine 702, elements may occur in sequences other than as described above. In such embodiments, the routine 702 may, for example, omit block 704. Accordingly, storage command metrics can be selected by another entity in network 120. For example, virtual machine 112 can send a metric processing request, on behalf of client computing device 150, with certain metrics and associated storage volumes already identified for metric processing. One skilled in the art will appreciate that additional variations are possible and within the scope of the present disclosure.

Figure 8A:
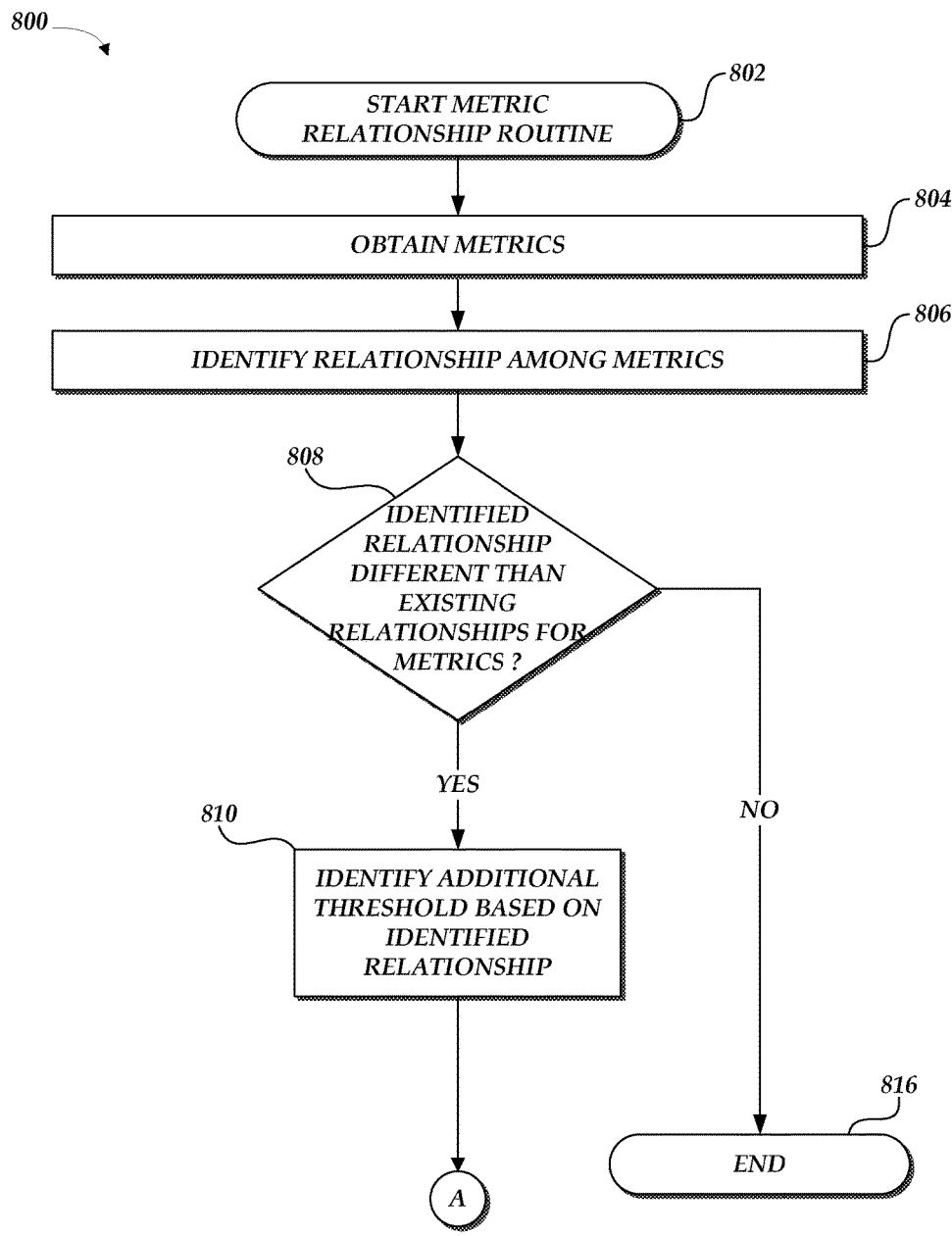
FIGS. 8A and 8B are a flow diagram of an illustrative metric relationship routine implemented by a monitoring service.
Figure 8B:
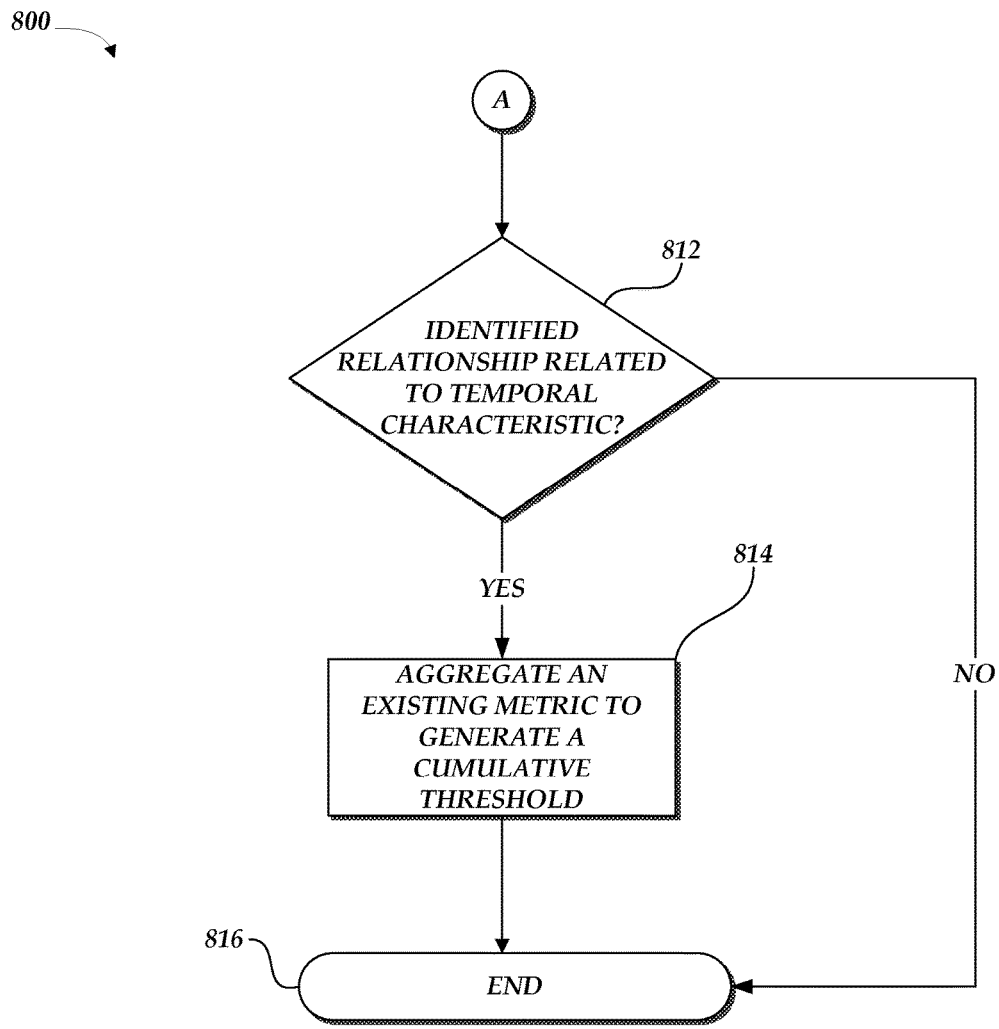

FIGS. 8A-8B are a flow diagram of an illustrative metric relationship routine 802 implemented by a monitoring service. As depicted in FIG. 8A, at block 804, metrics are obtained by monitoring service 140. For example, the metrics can be storage command metrics obtained from storage service 130. In other embodiments, monitoring service 140 can obtain metrics from a data store within monitoring service 140 or any other network entity within network 120. In some embodiments, monitoring service 140 can send a request for metrics to storage service 130 or any other network entity with network 120. In this case, obtaining metrics can be seen as a response to the request sent by monitoring service 140. In one embodiment, monitoring service 140 can receive user input from an operator of the storage system through a user interface of monitoring service 140. For example, the received user input can be translated into a request for metrics.

At block 806, relationships are identified among the metrics. As described above with respect to FIG. 3B, correlation relationships can be identified by monitoring service 140. Other relationships can also be identified from the storage command metrics. Generally, correlation relationships trend over a period of time, making root cause detection possible. For example, a correlation relationship can represent the state of a storage system over several storage system events. Storage system events can be the instantiation of storage volumes, replications of storage volumes, reading, and writing to storage volumes via I/O operations, or any other event that can be initiated by a storage command request to storage service 130. However, not all root causes trend over a period of time. Root causes of storage system issues can also be caused by other types of events: a large-scale event and a short-term event.

As an example of a large scale event, monitoring service 140 can identify a relationship from storage command metrics when several storage volumes are instantiated in storage service 130. Such an instantiation can be caused by an unauthorized client computing device 150. Large-scale events can also include power outages and downtimes in certain geographical regions. Accordingly, for any of these cases, while correlation relationships can detect the root cause associated with faulty storage volumes in a large-scale event, the large-scale event itself is a different relationship; it indicates that a minimum operation threshold, across all storage volumes, can be identified.

As an example of a short-term event, a storage volume can be attached to a virtual machine for a short period. While an existing storage command metric can measure that the storage volume will be operating, the storage command metric itself, taken over time, can indicate that the short-period storage volume may not have operated properly. As another example of a short-term even, a storage volume may have an alternating downtime: it operates for a short time period, then faulty, then operating, and so forth. Each of these periods of operation occurs as a brief, short-term event, rather than a set of storage system events occurring over time. Again, a storage command metric taken over time can indicate that the alternating downtime storage volume may not have operated properly. Accordingly, both examples, the scenarios indicate that a different relationship exists as compared to the storage command metric, and that a different metric can be used to measure this relationship.

Continuing in routine 802, at decision block 808, monitoring service 140 determines whether the identified relationship is different than an existing relationship as derived from the storage command metrics. Storage command metrics can be used to derive correlation relationships. This can be referred to as an existing relationship. However, if monitoring service 140 determines that a large-scale event or a short-term event exists, the routine 802 proceeds to block 810. If, however, no new identified relationship exists or is not different than the existing relationship, routine 802 proceeds to block 816. Thereafter, at block 816, routine 802 ends.

At block 810, monitoring service 140 identifies an additional threshold based on the newly identified relationship. As an example of an additional threshold for a large-scale event, a threshold for a power outage can be defined by certain metrics: the number of active volumes and start and stop times for I/O operations on those active volumes. If 1) the number of active volumes exceeds a quantity threshold and 2) the start and stop times for operations correspond to a time period for a large scale-event, an additional threshold can be defined in terms of this quantity threshold in this time period threshold. In some cases, rather than using the start and stop times for I/O operations, the time period threshold can be user defined, for example, an operator of the storage system specifying a time when a large-scale event will occur. As another example, an additional threshold can also be defined for the large-scale event corresponding to the instantiation of several storage volumes: the number of active volumes can correspond to a quantity threshold and a time of usage for a customer account can correspond to a time period threshold. Next, routine 802 proceeds to decision block 812.

As depicted in FIG. 8B and continuing in routine 802, at decision block 812, monitoring service 140 determines whether the newly identified relationship is related to a temporal characteristic. The temporal characteristic can be a short-term event that can only be measured in terms of certain time periods. For example, with respect to the alternating downtime storage volume, the temporal characteristic can be that operation of that storage volume varies in time, but does not trend in time like a correlation relationship. Accordingly, such a short-term event is related to temporal characteristic, and routine 802 proceeds to block 814. If no such temporal characteristic is related to the identified relationship, routine 802 proceeds to block 816. Thereafter, routine 802 ends at block 816.

At block 814, monitoring service 140 aggregates an existing metric to generate a cumulative threshold. For example, with respect to the alternating downtime storage volume, monitoring service 140 can aggregate the number of I/O read operations per second for each time that that storage volume is in operation. If that aggregated metric exceeds a cumulative threshold, then that alternating downtime storage volume would be deemed faulty. However, if that cumulative threshold was not exceeded by the alternating downtime storage volume, then the monitoring service 140 would not identify such a volume as a faulty storage volume. Other aggregated metrics are possible. For example, network latency can be aggregated over a time period to determine whether a certain storage volume exceeds a cumulative threshold, rather than as compared to an average network latency that may be derived from a storage command metric. Thereafter, routine 802 ends at block 816.

In various embodiments, routine 802 may be performed by a monitoring service 140 of a storage system. In other embodiments, a physical computing device with computer-executable instructions may cause the computing device to perform routine 802. In some embodiments of the routine 802, elements may occur in sequences other than as described above. In such embodiments, the routine 802 may, for example, omit block 804. Accordingly, metrics can be dynamically provided to a monitoring service 140; or, in another embodiment, the metrics can be collected by the monitoring service 140 from a storage service 130. One skilled in the art will appreciate that additional variations are possible and within the scope of the present disclosure.

Depending on the embodiment, certain acts, events, or functions of any of the methods described herein can be performed in a different sequence, can be added, merged, or left out altogether (e.g., not all described acts or events are necessary for the practice of the algorithm). Moreover, in certain embodiments, acts or events can be performed concurrently, e.g., through multi-threaded processing, interrupt processing, or multiple processors or processor cores or on other parallel architectures, rather than sequentially.

The various illustrative logical blocks, modules, and method elements described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various illustrative logical blocks and modules described in connection with the embodiments disclosed herein can be implemented or performed by a machine, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor can be a microprocessor, but in the alternative, the processor can be a controller, microcontroller, or state machine, combinations of the same, or the like. A processor can also be implemented as a combination of computing devices, e.g., a combination of a DSP and a microprocessor, a plurality of microprocessors, one or more microprocessors in conjunction with a DSP core, or any other such configuration.

The elements of a method, process, or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of computer-readable storage medium known in the art. A storage medium can be coupled to the processor such that the processor can read information from, and write information to, the storage medium. In the alternative, the storage medium can be integral to the processor. The processor and the storage medium can reside in an ASIC. The ASIC can reside in a user terminal. In the alternative, the processor and the storage medium can reside as discrete components in a user terminal.

All of the processes described herein may be embodied in, and fully automated via, software code modules executed by one or more general purpose computers or processors. The code modules may be stored in any type of computer-readable medium or other computer storage device. Some or all the methods may alternatively be embodied in specialized computer hardware. In addition, the components referred to herein may be implemented in hardware, software, firmware or a combination thereof.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B, and C" can include a first processor configured to carry out recitation A working in conjunction with a second processor configured to carry out recitations B and C.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, certain embodiments described herein can be embodied within a form that does not provide all of the features and benefits set forth herein, as some features can be used or practiced separately from others. All changes which come within the meaning and range of equivalency of the claims are to be embraced within their scope.

What is claimed is:

1. A system comprising:
   one or more virtual computing device instances for transmitting storage requests via a communications network, the one or more virtual computing device instances executing on behalf of a client computing device, and the one or more virtual computing device instances hosted on a host computing device;
   a storage processing service, executed on one or more storage computing devices, the storage processing service configured to:
      obtain a storage command request from a virtual computing device instance of the one or more virtual computing device instances;
      process the storage command request to generate a storage command processing result associated with at least one storage volume, the at least one storage volume associated with a storage computing device of the one or more storage computing devices;
      collect storage command metric information based at least in part on the storage command processing result; and
   a storage monitoring service, executed on one or more computing devices, configured to:
      obtain, from the storage processing service, the collected storage command metric information;
      process the collected storage command metric information for the at least one storage volume to generate a correlation processing result for a logical storage component representing a logical storage level of the one or more storage computing devices;
      identify, across the one or more storage computing devices, a correlation relationship; and
      identify, based on the identified correlation relationship, one or more faulty storage volumes among the one or more storage computing devices;
      for each faulty storage volume of the one or more faulty storage volumes, correlate one or more characteristics of a first faulty storage volume with corresponding characteristics of a second faulty storage volume, wherein the one or more characteristics represent logical storage levels of a storage system;
      identify a common logical storage component of the first faulty storage volume and the second faulty storage volume;
      determine that a quantity of the identified one or more faulty storage volumes satisfies a threshold; and
      issue a notification regarding the quantity of the identified one or more faulty storage volumes satisfying the threshold.

2. The system of claim 1, wherein the one or more characteristics corresponds to a server hosting the first faulty storage volume and the second faulty storage volume, wherein the storage monitoring service is further configured to:
   determine that the first faulty storage volume and the second faulty storage volume have exceeded a time threshold for being associated with a fault;
   correlate, at lower logical levels of the storage system, the one or more characteristics of the first faulty storage volume with corresponding characteristics of the second faulty storage volume at a lower logical storage level; and
   issue a second notification regarding the first faulty storage volume and second faulty storage volume.

3. The system of claim 1, wherein the identified common logical storage component corresponds to a shared network, wherein correlating the one or more characteristics of the first faulty storage volume with the corresponding characteristics of the second faulty storage volume comprises determining that the first faulty storage volume and the second faulty storage volume are on the shared network, the notification further comprising information regarding the first faulty storage volume and the second faulty storage volume being on the shared network.

4. The system of claim 1, wherein the threshold corresponds to a maximum number of faulty volumes.

5. A computer-implemented method for identifying a common logical storage component of storage volumes, the computer-implemented method comprising:

obtaining metric information from a storage processing service, the metric information based at least in part on a storage command request;

obtaining correlated relationship information regarding the obtained metric information, the correlated relationship information indicating a relationship between a first fault of at least one storage volume and a second fault of a logical storage component, wherein the logical storage component includes a logical storage level of two or more storage volumes including the at least one storage volume;

identifying one or more storage volumes based at least in part on the correlated relationship information, each storage volume indicating a fault;

for each storage volume of the one or more storage volumes, correlating a first characteristic of a first storage volume with a second characteristic of a second storage volume;

identifying a common logical storage component of the first storage volume and the second storage volume;

determining that a quantity of the one or more storage volumes satisfies a threshold; and issuing a notification regarding the quantity of the one or more storage volumes satisfying the threshold.

6. The computer-implemented method of claim 5 further comprising:
determining that the first storage volume and the second storage volume have exceeded a time threshold for being associated with a first fault.

7. The computer-implemented method of claim 5, wherein the first characteristic corresponds to the first storage volume being on a storage server, wherein the second characteristic corresponds to the second storage volume being on the storage server, wherein the identified common logical storage component corresponds to a storage component at a lower logical storage level than the storage server, further comprising issuing a second notification regarding the first storage volume and the second storage volume, the second notification comprising information about the lower logical storage level.

8. The computer-implemented method of claim 5 wherein the identified common logical storage component corresponds to a shared network, the computer-implemented method further comprising:
determining whether the first storage volume and the second storage volume share a lower logical storage level; and
responsive to the determination that the first storage volume and the second storage volume do not share a lower logical storage level, issuing a second notification regarding the first storage volume and second storage volume being on the shared network.

9. The computer-implemented method of claim 5, wherein the first fault of the at least one storage volume corresponds to a number of I/O read operations per second falling below an I/O read operation threshold, and wherein the second fault of the logical storage component corresponds to a network latency of the logical storage component, wherein a number of I/O read operations per second at the logical storage component affects the network latency of logical storage component.

10. The computer-implemented method of claim 5, wherein the first fault of the at least one storage volume further corresponds to a number of I/O write operations per second falling below an I/O write operation threshold and a queue length of the at least one storage volume exceeding a threshold defining a maximum queue length.

11. The computer-implemented method of claim 5, wherein the logical storage component is determined according to a location on a rack.

12. The computer-implemented method of claim 5 further comprising:
obtaining an index of storage volumes indicating a fault from a monitoring service.

13. The computer-implemented method of claim 5 further comprising:
determining whether one or more suppression rules correspond to the at least one storage volume based at least in part on the identified correlation relationship information; and
responsive to determining that the one or more suppression rules correspond to the at least one storage volume, suppressing notifications regarding the at least one storage volume.

14. The computer-implemented method of claim 5, wherein the storage command request is received from a virtual computing device instance hosted on a host computing device, wherein the virtual computing device instance is executing the storage command request on behalf of a client computing device.

15. A non-transitory computer-readable storage medium including computer-executable instructions comprising:
computer-executable instructions that, when executed by a computing device associated with one or more client computing devices:
obtain metric information from a storage processing service, the metric information based at least in part on a storage command request from a virtual computing device instance hosted on a host computing device, wherein the virtual computing device instance is executing the storage command request on behalf of a client computing device;
obtain correlated relationship information regarding the obtained metric information, the correlated relationship information indicating a relationship between a first fault of at least one storage volume and a second fault of a logical storage component, wherein the logical storage component includes a logical storage level of two or more storage volumes including the at least one storage volume; and
identify one or more storage volumes based at least in part on the correlated relationship information, each storage volume indicating a fault;
for each storage volume of the one or more storage volumes, correlate a first characteristic of a first storage volume with a second characteristic of a second storage volume;
identify a shared characteristic of the first storage volume and the second storage volume;
determine that a quantity of the one or more storage volumes satisfies a threshold; and
issue a notification regarding the quantity of the one or more storage volumes satisfying the threshold.

16. The non-transitory computer-readable storage medium of claim 15, wherein the threshold corresponds to a maximum number of faulty volumes.

17. The non-transitory computer-readable storage medium of claim 15 further comprising:
responsive to the identification of the shared characteristic being a shared network, determine whether the first storage volume and the second storage volume share a lower logical storage level; and
responsive to the determination that the first storage volume and the second storage volume do not share a lower logical storage level, issue a second notification regarding the first storage volume and second storage volume being on the shared network.

18. The non-transitory computer-readable storage medium of claim 15 further comprising, wherein the first fault of the at least one storage volume further corresponds to a queue length of the at least one storage volume exceeding a queue length threshold, the queue length having been generated by storage command requests from an account associated with the at least one storage volume.

19. The non-transitory computer-readable storage medium of claim 15 further comprising:
   identify a root cause of a storage system issue based at least in part on the correlated relationship information.

20. The non-transitory computer-readable storage medium of claim 15 further comprising:
   issue a second notification regarding the shared characteristic according to a severity level of the second notification.

21. The non-transitory computer-readable storage medium of claim 20, wherein the severity level of the second notification corresponds to a low severity level indicating that the first storage volume and the second storage volume have been at fault for less than ten minutes.

22. The non-transitory computer-readable storage medium of claim 20, wherein the severity level of the second notification corresponds to a high severity level indicating that the first storage volume and the second storage volume have been at fault for more than ninety minutes, wherein the second notification is issued directly to an operator of the storage system with the severity level indicated as part of the second notification.

* * * * *